United States Patent
Yang et al.

(10) Patent No.: US 10,475,207 B2
(45) Date of Patent: *Nov. 12, 2019

(54) FORECASTING MULTIPLE POSES BASED ON A GRAPHICAL IMAGE

(71) Applicant: Adobe Inc., San Jose, CA (US)

(72) Inventors: Jimei Yang, Mountain View, CA (US); Yu-Wei Chao, Ann Arbor, MI (US); Scott Cohen, Sunnyvale, CA (US); Brian Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,161

(22) Filed: Aug. 7, 2018

(65) Prior Publication Data

US 2018/0357789 A1 Dec. 13, 2018

Related U.S. Application Data

(63) Continuation of application No. 15/481,564, filed on Apr. 7, 2017, now Pat. No. 10,096,125.

(51) Int. Cl.
*G06T 7/73* (2017.01)
*G06T 7/246* (2017.01)
(Continued)

(52) U.S. Cl.
CPC .......... *G06T 7/74* (2017.01); *G06K 9/00369* (2013.01); *G06K 9/46* (2013.01); *G06K 9/6228* (2013.01); *G06N 3/0445* (2013.01); *G06N 3/0454* (2013.01); *G06N 3/08* (2013.01); *G06T 7/246* (2017.01); *G06T 7/73* (2017.01); *G06T 2207/10016* (2013.01); *G06T 2207/20084* (2013.01); *G06T 2207/30196* (2013.01)

(58) Field of Classification Search
CPC ...... G06N 99/005; G06N 5/025; G06Q 10/04; G06Q 50/01
USPC ......... 382/156, 157, 158, 209, 278; 128/925
See application file for complete search history.

(56) References Cited

U.S. PATENT DOCUMENTS

| 5,710,590 A | 1/1998 | Ichige et al. |
| 5,796,611 A | 8/1998 | Ochiai et al. |

(Continued)

FOREIGN PATENT DOCUMENTS

| CN | 108694369 | 10/2018 |
| WO | WO2016156236 | 10/2016 |

OTHER PUBLICATIONS

U.S. Appl. No. 15/481,564, "Notice of Allowance", dated May 29, 2018, 9 Pages.

(Continued)

*Primary Examiner* — Yosef Kassa
(74) *Attorney, Agent, or Firm* — Kilpatrick Townsend & Stockton LLP

(57) ABSTRACT

A forecasting neural network receives data and extracts features from the data. A recurrent neural network included in the forecasting neural network provides forecasted features based on the extracted features. In an embodiment, the forecasting neural network receives an image, and features of the image are extracted. The recurrent neural network forecasts features based on the extracted features, and pose is forecasted based on the forecasted features. Additionally or alternatively, additional poses are forecasted based on additional forecasted features.

20 Claims, 12 Drawing Sheets

(51) Int. Cl.
*G06N 3/04* (2006.01)
*G06K 9/00* (2006.01)
*G06K 9/46* (2006.01)
*G06K 9/62* (2006.01)
*G06N 3/08* (2006.01)

(56) References Cited

U.S. PATENT DOCUMENTS

| | | | | |
|---|---|---|---|---|
| 6,640,145 | B2 * | 10/2003 | Hoffberg | G05B 19/0426 700/17 |
| 7,006,881 | B1 | 2/2006 | Hoffberg et al. | |
| 7,374,405 | B2 * | 5/2008 | Wobben | B65D 85/68 416/244 R |
| 7,813,822 | B1 * | 10/2010 | Hoffberg | G06K 9/00369 381/73.1 |
| 7,904,187 | B2 | 3/2011 | Hoffberg et al. | |
| 7,966,078 | B2 * | 6/2011 | Hoffberg | G05B 15/02 700/17 |
| 8,107,527 | B1 | 1/2012 | Hobbs et al. | |
| 8,265,474 | B2 * | 9/2012 | Kanayama | H04N 5/23212 348/208.14 |
| 8,271,887 | B2 * | 9/2012 | Offer | H04L 65/1069 709/204 |
| 8,336,049 | B2 * | 12/2012 | Medovich | G06F 9/45533 718/1 |
| 8,345,768 | B1 | 1/2013 | Hobbs et al. | |
| 8,379,074 | B2 * | 2/2013 | Currivan | H04N 7/141 348/14.01 |
| 8,386,446 | B1 * | 2/2013 | Pasupathy | G06F 16/951 707/696 |
| 8,516,266 | B2 * | 8/2013 | Hoffberg | G05B 15/02 713/151 |
| 8,583,263 | B2 | 11/2013 | Hoffberg et al. | |

OTHER PUBLICATIONS

Dosovitskiy, et al., "FlowNet: Learning Optical Flow with Convolutional Networks", ICCV 2015.
Hornung, et al., "Character Animation from 2D Pictures and 3D Motion Data", TOG 2007.
Lan, et al., "A Hierarchial Representation for Future Action Prediction", ECCV 2014.
Mathieu, et al., "Deep Multi-Scale Video Prediction Beyond Mean Square Error", ICLR 2016.
Newell, et al., "Stacked Hourglass Networks for Human Pose Estimation", ECCV 2016.
Pintea, et al., "Deju Vu: Motion Prediction in Static Images", ECCV 2014.
Srivastava, et al., "Unsupervised Learning of Video Representations Using LSTMs", Proceedings of International Conference on Machine Learning, Feb. 16, 2015, 12 pages.
Walker, et al., "Dense Optical Flow Prediction from a Static Image", ICCV 2015.
Walker, et al., "Patch to the Future: Unsupervised Visual Prediction", CVPR 2014.
Zhang, et al., "From Actemes to Action: A Strongly-Supervised Representation for Detailed Action Understanding", ICCV 2013.
Search Report from related application GB18008841.7 dated Jun. 27, 2018, 1 page.

* cited by examiner

FORECASTING MULTIPLE POSES BASED ON A GRAPHICAL IMAGE

RELATED APPLICATIONS

The present application is a continuation of U.S. patent application Ser. No. 15/481,564 for "Forecasting Multiple Poses Based on a Graphical Image" filed Apr. 7, 2017, which is incorporated by reference herein in its entirety.

FIELD OF THE INVENTION

This disclosure relates generally to the field of artificial intelligence. More specifically but not by way of limitation, this disclosure relates to simulating decision-making processes and otherwise predicting actions based on a graphical image.

BACKGROUND

Systems that implement computer vision and artificial intelligence are used to predict human actions. For instance, a robot or computer-implemented program interacts with humans based in part on visual inputs, such as images received from a camera. A computer system including a camera uses images to prompt interactions with a human user, such as shaking hands or providing menu options on a user interface. Certain systems use one or more input images (e.g., frames of a video) as visual inputs to predict a single subsequent frame. However, these techniques are limited to forecasting a single next frame with respect to a subject (e.g., a user of a system that implements computer vision systems). A single "predicted" frame is inadequate to accurately determine the intent of the subject. A computer system that inaccurately predicts its user's intent will cause frustration. In the case of a system capable of physical interactions, such as a robot, inaccurate predictions could endanger the user. Thus, it is beneficial to develop techniques to forecast the pose (e.g., the position and location) of the subject to a point in the future.

SUMMARY

Embodiments are described herein for forecasting sequential poses of a subject based on an input image that depicts the subject. In an embodiment, a forecasting neural network includes components of an hourglass neural network, including an encoder neural network ("encoder") and a decoder neural network ("decoder"), and a recurrent neural network ("RNN"). An encoder is capable of extracting features from received data. A decoder is capable of determining outputs based on features. An RNN is capable of modifying received data based on memory information, such as memory information describing a previous state of the neural network. In an embodiment, the forecasting neural network is arranged with the RNN between the encoder and the decoder. The encoder extracts features from data. The RNN receives the extracted features, and provides modified features based on memory describing the forecasting neural network. The decoder produces output based on the modified features. In some cases, the forecasting neural network repeats steps related to modifying the features and producing output, such that a sequence of output is produced based on a sequence of modified features.

For example, a forecasting neural network receives an image depicting a person performing an action. The encoder extracts, from the image, features of the pose of the depicted person. The extracted features are provided to the RNN. Based on the extracted features, the RNN produces a set of forecasted features. The forecasted features are provided to a decoder network. Based on the forecasted features, the decoder network produces forecasted keypoints representing body joints of the person depicted in the image. In some cases, the RNN produces an additional set of forecasted features (e.g., a subsequent set of features). The additional forecasted features are provided to the decoder neural network, and the decoder neural network produces another set of forecasted keypoints. In some embodiments, techniques related to forecasting features and forecasting keypoints are repeated, generating a series of forecasts. In some cases, a series of forecasted poses is generated, based on the sets of forecasted keypoints.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
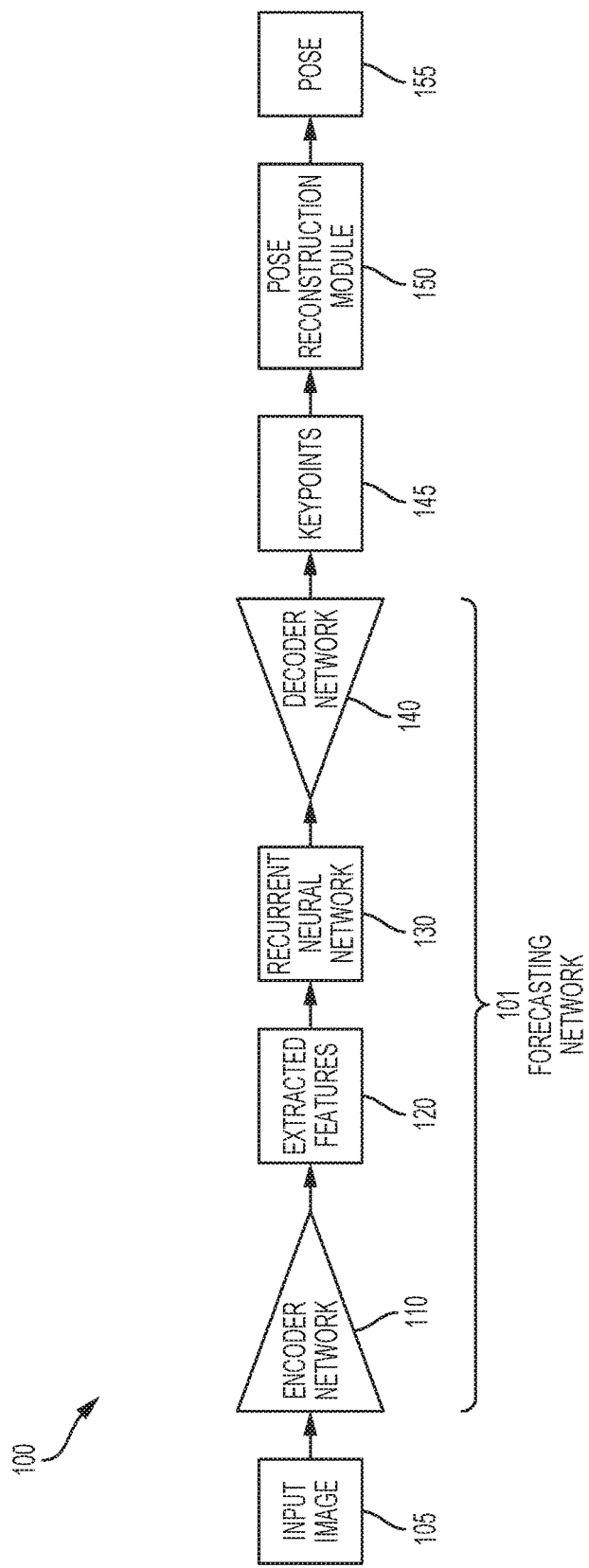
FIG. 1 is a block diagram depicting an example of a system including a forecasting neural network, according to certain embodiments.

Certain embodiments are described herein for forecasting a sequence of poses of a subject based on an input image that depicts the subject. As discussed above, prior techniques for forecasting poses do not provide multiple forecasted poses based on a single input image. Certain embodiments described herein use a forecasting neural network to determine multiple forecasted poses by extracting features of an image, forecasting changes to extracted features, and determining a pose based on the forecasted changes. By forecasting additional changes, the forecasting neural network determines a sequence of additional poses and thereby predicts the subject's motion to a point in the future. An interactive machine that forecasts human motion based on visual input is capable of accurately interpreting human behavior, and is capable of interacting with humans in a more natural way.

The following example is provided to introduce certain embodiments of the present disclosure. In this example, a forecasting neural network receives an input image, such as a graphical representation of a human subject performing an action. The forecasting neural network includes an encoder, an RNN, and a decoder. The encoder extracts one or more features (e.g., graphical qualities) from the input image. The RNN determines a set of forecasted features based on the extracted features. The forecasted features indicate changes that are expected in the features (e.g., a prediction of the subject's appearance in a potential future image). The decoder determines a set of forecasted keypoints (e.g., body joints of the image subject) based on the forecasted features. In some cases, steps performed by the forecasting neural network are repeated, thereby generating a sequence of forecasted feature sets and keypoint sets. A sequence of poses is generated based on the forecasted keypoints. For example, a pose reconstruction module determines one or more forecasted poses (e.g., keypoints connected in skeletal framework).

In some embodiments, the forecasting neural network includes a flow decoder. The flow decoder determines motion information based on the forecasted features received from the RNN. For example, the flow decoder determines that particular features (e.g., related to a hand throwing a baseball) have a displacement in a particular direction and distance. An image reconstruction module generates a forecasted graphical image based on the motion information. In some cases, such steps are repeated, generating a sequence of forecasted graphical images.

As used herein, the term "neural network" refers to one or more computer-implemented networks capable of being trained to achieve a goal. Unless otherwise indicated, references herein to a neural network include one neural network or multiple interrelated neural networks that are trained together.

As used herein, the term "image" refers to a digital image depicting a graphical representation of subject matter. For example, an image uses pixels or vector-based graphics to represent a depiction of a human. In some cases, the image is a stand-alone image, such as a photograph or a drawing. Additionally or alternatively, the image is included in a collection of images, such as a frame within an existing video.

As used herein, the term "pose" refers to a visible arrangement of a subject of an image. For example, a pose of a person depicted by an image includes the visible arrangement of the person's arms, legs, torso, head, hands, or feet. Additionally or alternatively, a pose includes the location of the person in the image (e.g., centered in the image, near an edge of the image). In some cases, not all portions of the subject are visible in the image. For example, in an image of a person preparing to throw a baseball, the person's torso could occlude some of the person's limbs.

For simplicity, the examples used herein will be described with reference to human subjects and poses. However, is to be understood that some or all of the techniques described herein can be applied to nonhuman subjects (e.g., animals), mechanical subjects (e.g., vehicles, robots), or artistic subjects (e.g., cartoon characters, paintings, computer-generated characters), and the poses of such subjects.

As used herein, the term "feature" refers to a graphical quality of an image. In some cases, features include portions of the image, such as groups of pixels. Additionally or alternatively, features include graphical representations of the image, such as graphical representations of vertical edges in the image, or rounded edges in the image. Additionally or alternatively, features include transformations of the image, such as a blue-filtered transformation of the image (e.g., from a red-green-blue image format). In some cases, features include non-graphical representations of graphical qualities, such as a mathematical gradient based on lighting depicted in the image.

As used herein, the term "keypoint" refers to a representation of an aspect of an image subject. For example, a keypoint represents a body joint of a person depicted in an image. In some cases, a set of keypoints represents multiple aspects of the image subject (e.g., a first keypoint corresponding to the head, a second keypoint corresponding to a shoulder). Additionally or alternatively, a keypoint is associated with a probability (e.g., a probability that the joint is where the keypoint is) or an identification (e.g., head, shoulder, ankle).

As used herein, the terms "apparent motion" and "optical flow" refer to an estimated displacement of pixels between multiple images. For example, in a series of images of a person throwing a baseball, pixels depicting the throwing arm move from an shoulder position down towards the ground. In some cases, apparent motion is represented by a motion vector indicating a displacement direction and a displacement distance. For example, the apparent motion of pixels depicting a throwing arm include motion vectors having a displacement direction towards the ground, a relatively small displacement distance for pixels related to the shoulder, and a relatively large displacement distance for pixels related to the hand.

As used herein, the terms "forecast" and "forecasted" refer to estimations of probable data configurations. In some cases, the forecasted data includes configurations of features, keypoints, apparent motion of pixels, poses, or other data related to an input image, as described herein.

Referring now to the drawings, FIG. 1 is a depiction of a system 100 including a forecasting neural network 101. The forecasting neural network 101 includes multiple component neural networks, including an encoder 110, an RNN 130, and a decoder 140. In some embodiments, the RNN 130 is arranged between the encoder 110 and the decoder 140 (e.g., an output of the encoder is provided to the RNN, and an output of the RNN is provided to the decoder). Additionally or alternatively, a pose reconstruction module 150 is included in the system 100.

In some embodiments, an input image, such as input image 105, is provided to the forecasting neural network 101. The encoder 110 receives the input image 105 and analyzes the image. Based on the analysis, the encoder 110 determines features of the input image 105. The features that are determined by the encoder 110 are extracted, and the set of extracted features 120 is provided by the encoder 110. In some cases, one or more features of the extracted features 120 are provided via skip connections, as described elsewhere herein.

In an embodiment, the extracted features 120 are received by the RNN 130. In some cases, the RNN 130 provides the extracted features 120 to the decoder 140. Additionally or alternatively, the RNN 130 modifies the extracted features 120 based on additional information, as described elsewhere herein, and the modified features are provided to the decoder 140. In some cases, one or more of the extracted features 120 or the modified features are provided to additional neural network components. For example, the RNN 130 provides a set of modified features to an additional RNN. In some cases, the RNN 130 comprises a set of multiple RNNs, as described elsewhere herein.

In some embodiments, the decoder 140 analyzes the extracted features 120 or the modified features received from RNN 130. Based on the analysis of the features, the decoder 140 determines estimated keypoints, such as keypoints 145. For example, the decoder 140 estimates keypoints including the locations of one or more body joints of the subject that is depicted by the input image 105. Additionally or alternatively, the decoder 140 identifies a type of the keypoints (e.g., identifying a left shoulder). In some cases, the estimated keypoints 145 are represented by graphical depictions (e.g., heatmaps). Additionally or alternatively, the keypoints 145 are represented by data structures indicating a probability associated with each keypoint. In some cases, the keypoints are represented by data structures, including data structures not intended for human interpretation.

In an embodiment, the keypoints 145 are provided to a pose reconstruction module 150. Based on the keypoints, the pose reconstruction module 150 determines a pose 155 associated with the subject of the input image 105. For example, if the keypoints 145 include probable locations for the image subject's head, shoulders, right elbow, and right hand, the pose reconstruction module 150 determines connections between the locations of the head and each shoulder, between the right shoulder and right elbow, and between the right elbow and right hand. The pose 155 is based on the determined connections. In some cases, the determined pose 155 is represented by one or more graphical depictions (e.g., skeletal poses). Additionally or alternatively, the determined pose 155 is represented by data structures, including in some cases data structures not intended for human interpretation.

In some cases, a neural network, including the forecasting neural network 101 or any component thereof, is trained to perform the functions described above. For example, the forecasting neural network 101 is provided with a series of images from a training dataset, and the output of the forecasting neural network 101 is evaluated against known output of the training data set. In some cases, the forecasting neural network is trained using a dataset featuring humans centrally located in the images. Additionally or alternatively, the forecasting neural network is trained using a dataset featuring humans at different locations in the images, including peripheral locations. One example of a training dataset for human poses is the Penn Action Dataset. However, other training datasets are available. It will be understood by those skilled in the art that the training data set affects the output of the neural networks. For example, a forecasting neural network that is trained using a dataset featuring an animal (e.g., horses) provides output describing keypoints of the featured animal.

Figure 2:
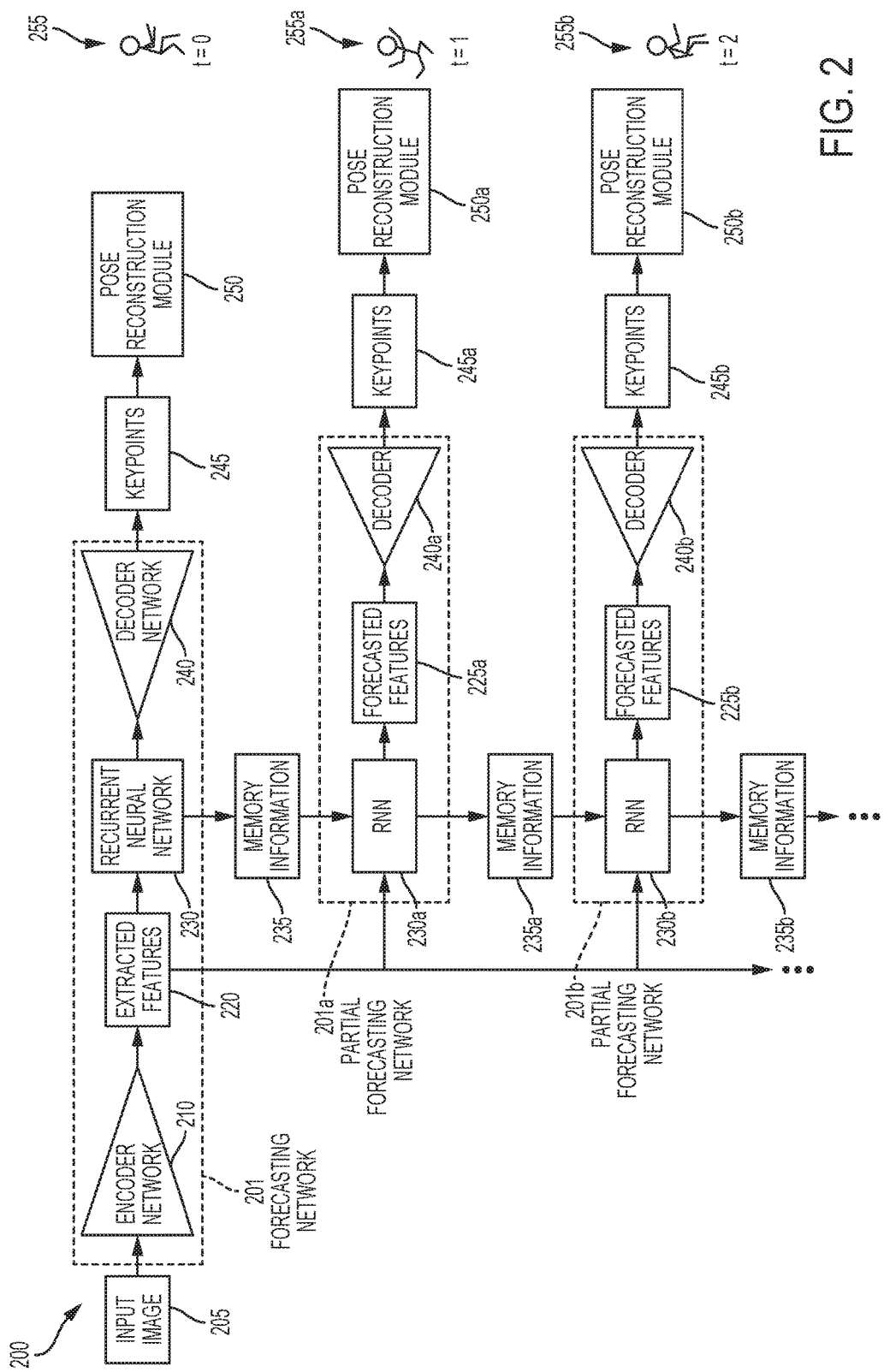
FIG. 2 is a block diagram depicting an example of a system including a forecasting neural network and one or more partial forecasting neural networks, according to certain embodiments.

FIG. 2 is a depiction of a system 200 including a forecasting neural network 201. In some cases, the system 200 includes additional neural networks, such as the partial forecasting neural network 201a, and the partial forecasting neural network 201b. The forecasting neural network 201 includes encoder 210, RNN 230, and decoder 240. The partial forecasting neural network 201a includes RNN 230a and decoder 240a. The partial forecasting neural network 201b includes RNN 230b and decoder 240b.

In some embodiments, the encoder 210 receives input image 205 and extracts features. The extracted features 220 are provided to RNN 230, which provides the extracted features 220 to decoder 240. The decoder 240 determines keypoints 245 based on the extracted features 220, and provides the keypoints 245 to the pose reconstruction module 250. The reconstruction module 250 determines a first pose based on the provided keypoints 245. For example, a pose 255 is determined by the pose reconstruction module 250. In some cases, the pose 255 is associated with a first timestamp, such as the timestamp t=0.

In some embodiments, the RNN 230 provides memory information, such as memory information 235, to one or more network components. For example, RNN 230a receives one or more of memory information 235 and the extracted features 220. Based on the memory information 235 and the extracted features 220, RNN 230a determines a set of forecasted features 225a. The forecasted features 225a are provided to the decoder 240a. Additionally or alternatively, the decoder 240a determines keypoints 245a based on the forecasted features 225a provided by RNN 230a. In some cases, the keypoints 245a are provided to an additional pose reconstruction module 250a. The reconstruction module 250a determines a second pose, such as forecasted pose 255a, based on the keypoints 245a. In some cases, the forecasted pose 255a is associated with a second time, such as the timestamp t=1.

In some embodiments, additional memory information is provided to additional partial forecasting neural networks, and additional poses are determined as described above. For example, RNN 230a provides memory information 235a to additional RNN 230b. Based on memory information 235a and the extracted features 220, RNN 230b determines a set of forecasted features 225b. The forecasted features 225b are provided to the decoder 240b. The decoder 240b determines keypoints 245b, which are provided to additional pose reconstruction module 250b. An additional pose, such as forecasted pose 255b, is determined based on the keypoints 245b, and associated with a third timestamp, such as timestamp t=2. The techniques described above can be repeated to produce additional poses associated with additional timestamps. For example, RNN 230b provides memory information 235b to an additional RNN.

Although the neural networks 201, 201a, and 201b are depicted as separate networks, other configurations are possible. For example, by providing the memory information 235 as an input to the RNN 230, the forecasting neural network 201 accomplishes some of the techniques described above in stages (e.g., determining the pose associated with t=0 in a first stage and determining the pose associated with t=1 in a second stage). Additionally or alternatively, a pose reconstruction module, such as module 250, accomplishes some of the techniques described above in stages.

Recurrent Hourglass Network

In some embodiments, a forecasting neural network includes a recurrent hourglass network, and the recurrent hourglass network performs techniques related to one or more of feature extraction, feature forecasting, or keypoint determination. In some cases, the recurrent hourglass network includes layers, such as layers in an encoder or a decoder. For example, layers in an encoder perform different types of analysis on an input image. In some cases, each particular encoder layer provides features based on the particular analysis performed by that layer. Additionally or alternatively, layers in a decoder perform different types of analysis on received features, and each particular decoder layer provides a set of keypoints based on the layer's particular analysis. In some cases, each particular encoder layer is associated with a particular decoder layer.

In some cases, each particular encoder layer downsamples a received image, such as to perform the analysis of that particular encoder layer. An additional encoder layer performs additional downsampling, based on an additional type of encoder analysis. In some cases, each round of downsampling reduces the visual quality of the output image, but provides features based on the related analysis performed by that encoder layer. Additionally or alternatively, a decoder layer upsamples a received image, such as to provide a set of keypoints based on that decoder layer's analysis. An additional decoder layer performs additional upsampling, based on additional type of decoder analysis. In some cases, a forecasting neural network is implemented without layers (e.g., without a recurrent hourglass network), and provides keypoints based on analysis that does not include downsampling or upsampling.

In some embodiments, multiple rounds of downsampling reduce the visual quality of a received image. For example, a recurrent hourglass network has a series of multiple encoder layers and a series of multiple associated decoder layers. The series of multiple encoder layers downsamples a received image multiple times (e.g., a round of downsampling for each encoder layer). After multiple rounds of downsampling, the image has relatively poor visual quality. If the series of multiple associated decoder layers provide keypoints based on the poor-quality image, the provided keypoints could have reduced accuracy. Providing the image received by the associated encoder layer could increase accuracy of the decoder layers' outputs.

In some embodiments, a skip connection carries information from a particular encoder layer to a particular decoder layer. For example, a skip connection between an encoder layer and an associated decoder layer provides an image that is unaffected by the encoder layer's downsampling. The skip connection provides the received image (e.g., with an unaffected visual quality) to the associated decoder layer, which provides keypoints based in part on the received image (e.g., the unaffected image). In some cases, the associated decoder layer provides keypoints having increased accuracy, based on the unaffected image provided via the skip connection.

In some cases, keypoints determined by a recurrent hourglass network that includes skip connections match the input image more closely than keypoints determined without skip connections. Additionally or alternatively, a pose that is reconstructed using keypoint from a recurrent hourglass network with skip connections more accurately represents the pose of the image's subject.

Figure 3:
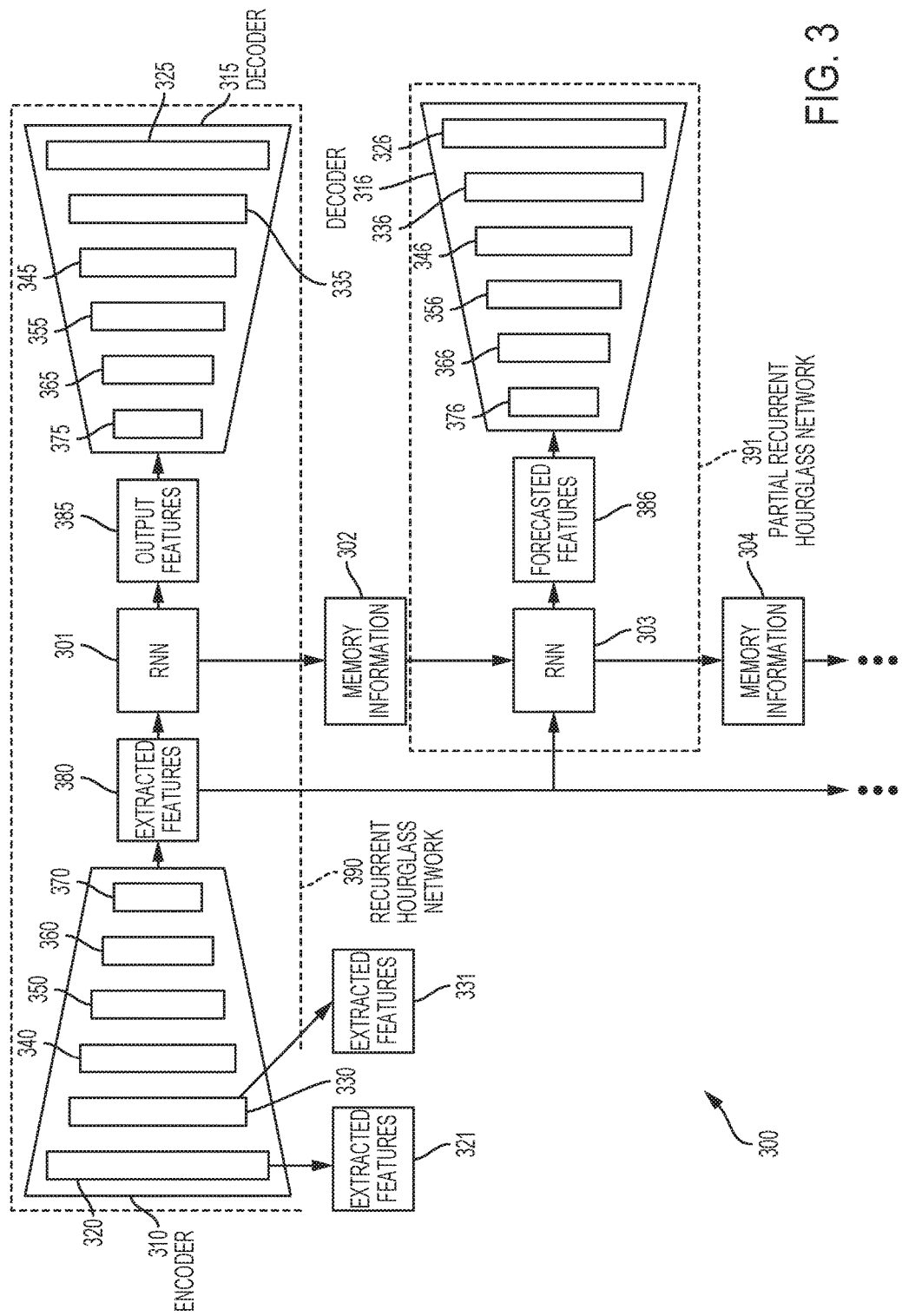
FIG. 3 is a block diagram depicting an example of a system including a forecasting neural network having layers, according to certain embodiments.

FIG. 3 depicts an example of a forecasting neural network 300 including a recurrent hourglass network 390 with layers. The recurrent hourglass network 390 includes encoder 310, RNN 301, and decoder 315. The RNN 301 receives output from the encoder 310 and provides input to the decoder 315. The encoder 310 is capable of extracting image features from an input image, and the decoder 315 is capable of determining one or more keypoints based on the input from RNN 301.

In some cases, the forecasting neural network 300 includes a partial recurrent hourglass network 391. The partial recurrent hourglass network 391 includes RNN 303, and decoder 316. The RNN 303 receives outputs from one or more of encoder 310 and RNN 301, and provides input to the decoder 316. The decoder 316 is capable of determining one or more forecasted keypoints based on the input from RNN 303.

In some embodiments, each of the encoder 310 and the decoders 315 and 316 comprises multiple layers. Each layer in the encoder 310 is associated with a layer in the decoder 315. For example, the encoder layer 320 is associated with the decoder layer 325, and encoder layers 330, 340, 350, 360, and 370 are respectively associated with decoder layers 335, 345, 355, 365, and 375. Additionally or alternatively, each layer in the encoder 310 is associated with a layer in the decoder 316. For example, the encoder layer 320 is associated with the decoder layer 326, and encoder layers 330, 340, 350, 360, and 370 are respectively associated with decoder layers 336, 346, 356, 366, and 376.

In the encoder 310, each of layers 320, 330, 340, 350, 360, and 370 identifies one or more features extracted by the encoder. For example, the layer 320 identifies a feature 321 based on analysis of an input image. Additionally or alternatively, an identified features is based on analysis of the input image and information received from an additional layer. For example, layer 330 receives an input image and information from layer 320, and identifies a feature 331 based on analysis of the image and the received information. In some cases, the identified features are associated with additional information related to the analysis. For example, feature 321 is associated with analysis information generated by layer 320's analysis of the input image.

In some embodiments, the encoder 310 provides data, such as data 380, to additional neural network components, such as RNN 301, RNN 303, or both. In some cases, the data 380 includes one or more of the extracted features. For example, data 380 includes the features 321 and 331. Additionally or alternatively, data 380 includes the analysis information associated with the extracted features.

In some embodiments, the RNN 301 generates output data, such as output data 385, based on the received data 380. In some cases, the data 385 includes the extracted features. Additionally or alternatively, the RNN 301 generates memory information, such as memory information 302, based on the received data 380. The memory information indicates a current or recent condition of data, such as a recent condition of data received by the RNN. In some cases, a particular RNN receives null memory information, such as an input of all zeros, or indications that recent conditions are identical or similar to current conditions. Responsive to receiving null memory information, the RNN provides output data that is similar or identical to received data. For example, if RNN 301 does not receive memory data, the output data 385 is similar or identical to the received data 380.

In an embodiment that includes multiple recurrent hourglass networks (or multiple partial recurrent hourglass networks), one or more of the RNNs generates output data based on received memory information and received data. For example, RNN 303 generates output data 386 based on data 380 and the memory information 302. In some cases, the data 386 includes forecasted features. Differences between data 385 output by RNN 301 and data 386 output by RNN 303 are related to the memory information 302 that is received by RNN 303. Additionally or alternatively, the RNN 303 generates additional memory information 304, which is provided to additional network components, such as an additional partial recurrent hourglass network (not shown in FIG. 3) that is capable of determining one or more of a forecasted feature or a forecasted keypoint.

In some embodiments, a layer in a decoder estimates one or more keypoints based on received features. In some cases, the keypoints are associated with a timestamp. For example, in decoder 315, each of layers 325, 335, 345, 355, 365, and 375 analyzes one or more extracted features included in output data 385, and estimates one or more keypoints based on the analysis. The keypoints estimated by the layers of decoder 315 are associated with a first timestamp (e.g., t=0). Additionally or alternatively, in decoder 316, each of layers 326, 336, 346, 356, 366, and 376 analyzes one or more forecasted features included in output data 386, and estimates one or more forecasted keypoints based on the analysis. The forecasted keypoints estimated by the layers of decoder 316 are associated with a second timestamp (e.g., t=1).

Additionally or alternatively, a first layer of the decoder estimates the keypoints based on the estimation of a second layer. For example, layer 365 estimates one or more keypoints based on a combination of the output data 385 and estimated keypoints provided by layer 375.

In some cases, the keypoints, including forecasted keypoints, are represented as a set of detection maps, such as heatmaps indicating a probable location of each keypoint. Additionally or alternatively, the keypoints are associated with an identified type, such as an identification of a particular keypoint as a left shoulder. The estimated keypoints are provided to one or more pose reconstruction modules, as described elsewhere herein.

In some embodiments, a feature extracted by a particular encoder layer is provided to the particular associated decoder layer via a skip connection. Additionally or alternatively, information associated with the encoder layer's analysis is provided to the particular associated decoder layer via the skip connection. In some cases, the skip connection provides to the decoder layer only information that is related to the associated encoder layer. Additionally or alternatively, the skip connection provides to the decoder layer information related to the associated encoder layer, and information related to one or more additional encoder layers, from which the associated encoder layer receives input. In some cases, a skip connection comprises one or more connections that allow transfer of information between a particular encoder layer and a particular associated decoder layer. Additionally or alternatively, a skip connection comprises one or more connections between a particular pair of associated layers and a particular RNN that is associated with the particular pair.

Figure 4:
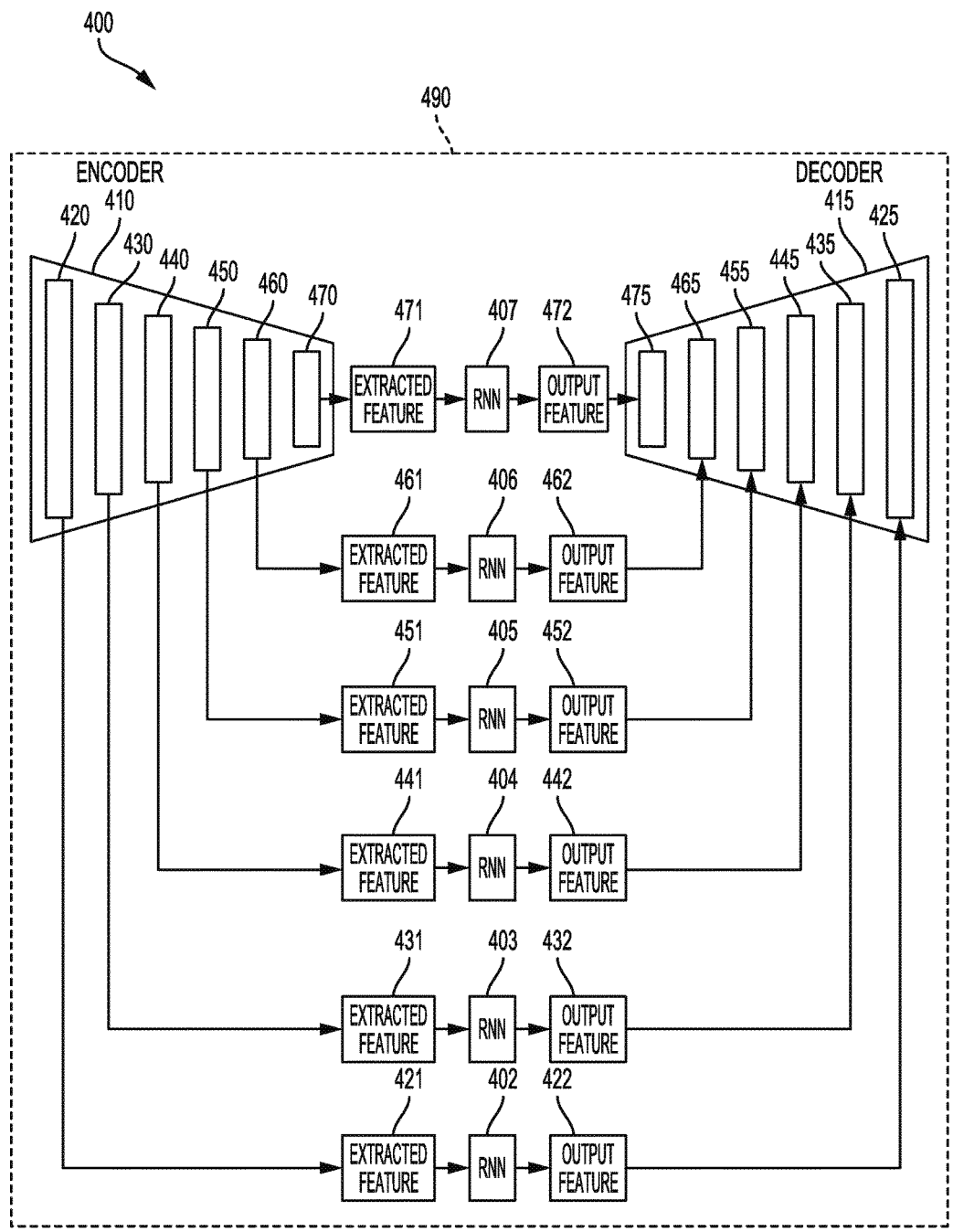
FIG. 4 is a block diagram depicting an example of a system including a forecasting neural network having skip connections, according to certain embodiments.

FIG. 4 depicts an example of a forecasting neural network 400 including a recurrent hourglass network 490 with skip connections. The recurrent hourglass network 490 includes encoder 410, decoder 415, and RNNs 402, 403, 404, 405, 406, and 407. The RNNs 402-407 receive outputs from the encoder 410 and provide inputs to the decoder 415. In some cases, the encoder 410 is capable of extracting image features from an input image, and the decoder 415 is capable of determining one or more keypoints based on the inputs from RNNs 402-407.

In some embodiments, each of the encoder 410 and the decoder 415 comprises multiple layers. Each layer in the encoder 410 is associated with a layer in the decoder 415. For example, the encoder layer 420 is associated with the decoder layer 425, and encoder layers 430, 440, 450, 460, and 470 are respectively associated with decoder layers 435, 445, 455, 465, and 475.

In the encoder 410, each of layers 420, 430, 440, 450, 460, and 470 identifies one or more features extracted by the encoder. In some cases, the features identified by the layer are associated with additional information related to the analysis. The extracted features, associated information, or both are provided to additional neural network components via one or more skip connections. For example, the encoder layer 420 provides data 421 to RNN 402 via a skip connection. Encoder layer 430 provides data 431 to RNN 403 via a second skip connection. Encoder layer 440 provides data 441 to RNN 404 via a third skip connection. Encoder layer 450 provides data 451 to RNN 405 via a fourth skip connection. Encoder layer 460 provides data 461 to RNN 406 via a fifth skip connection. Encoder layer 470 provides data 471 to RNN 407 via a sixth skip connection.

In some embodiments, one or more RNNs in the recurrent hourglass network 490 generates output data based on the received data. For example, RNNs 402-407 each generate respective output data 422,432, 442, 452, 462, and 472 based on respective received data 421, 431, 441, 451, 461, and 471. In some cases (e.g., at a timestamp t=0), the particular RNN receives null memory information, or receives no memory information, and the output data includes one or more features extracted by the encoder layer that shares a skip connection with the RNN. Additionally or alternatively (e.g., at a timestamp t>0), the particular RNN receives memory information, and the output data includes one or more forecasted features based on the features extracted by the encoder layer skip connected to the RNN.

In an embodiment that includes multiple recurrent hourglass networks (or multiple partial recurrent hourglass networks), one or more RNNs generates output data based on received memory information and received data. For example, one or more of RNNs 402-407 generates memory information (not depicted in FIG. 4). In some cases, the generated memory information is provided to additional network components, such as an additional RNN included in a partial recurrent hourglass network (not depicted in FIG. 4).

In some embodiments, a layer in a decoder estimates one or more keypoints based on features received via a skip connection from the associated encoder layer. For example, in decoder 415, each of layers 425, 435, 445, 455, 465, and 475 estimates one or more keypoints based on analysis of respective output data 422,432, 442, 452, 462, and 472.

In some cases, the decoder provides the keypoints identified by each of the decoder layers. Additionally or alternatively, the decoder provides a set of keypoints based on a combination of the keypoints estimated by each decoder layer. For example, each of decoder layers 425, 435, 445, 455, 465, and 475 provides a set of multiple keypoints representing body joints corresponding to the subject of the input image. In some cases, each particular set of keypoints has a respective probability, location, and identification for each keypoint in the set, based on the analysis of the particular decoder layer providing the set. The decoder 415 provides a set of keypoints based on a combination of the sets provided by each decoder layer. For example, the decoder 415 provides a keypoint identified as a left shoulder having an associated location and probability, based on a combination of the locations and probabilities of the "left shoulder" keypoints estimated by one or more of layers 425, 435, 445, 455, 465, and 475. In some cases, the keypoints estimated by the decoder layers, or keypoints based on the estimations of decoder layers, are associated with a timestamp.

Feature Extraction

In some embodiments, the encoder extracts one or more features from the input image. The extracted features represent information included in the input image. For example, the input image includes low-level features, such as vertical or horizontal edges, corners, or color differences between areas of the input image. In some cases, a lower-level feature is associated with a higher-resolution image. Additionally or alternatively, the input image includes high-level features, such as a block of image data representing a torso, or data representing lighting. In some cases, a higher-level feature is associated with a lower-resolution image. The feature examples provided herein are non-limiting, and additional features are possible, including features not intended for graphical representation (e.g., pixel gradients, mathematical transformations of image data).

In some embodiments, a particular layer included in the encoder receives the input image, or information related to the input image. For example, the input image is received by a first layer that is capable of extracting lower-level features. The input image has a relatively high resolution (e.g., areas of the input image are clearly distinguished). Based on the input image, the first layer extracts one or more lower-level features, such as edges. In some cases, the high resolution of the input image improves accuracy of the extracted low-level features. For example, an input image with clearly distinguished pixel regions improves accuracy of extracting edges of the pixel regions.

In an embodiment, the first layer provides the first set of extracted features, information associated with the features (e.g., image data), or both. For example, the first layer provides the features and associated information to a RNN via a skip connection. Additionally or alternatively, the first layer provides the features, associated information, or both to a second layer. In some cases, the associated information (e.g. image data) is adjusted. For example, high-resolution image data is adjusted to have a lower resolution.

Based on the adjusted information, the second layer extracts a second set of features. In some cases, the second layer provides the second features and associated information to a third layer, to a RNN via a skip connection, or both. In some cases, the associated information is also adjusted, and the third layer extracts a third set of features based on this information.

In some cases, an additional layer is capable of extracting higher-level features. For example, an additional layer receives information including image data adjusted to have a relatively low resolution. Based on the relatively low-resolution data, the additional layer extracts one or more higher-level features, such as a pixel region identified as a leg.

In some embodiments, techniques related to extracting features, adjusting associated information, and providing the adjusted information to an additional layer or to an RNN via a skip connection are repeated multiple times, based on the implementation of the encoder. Additionally or alternatively, extracted features, associated information, or both are provided to additional neural networks. For example, the features and information are provided to one or more partial recurrent hourglass networks capable of forecasting features more keypoints based on the extracted features.

Detection of Subject Pose

Based on the extracted or forecasted features, the decoder estimates a location of a keypoint of the image subject. For example, the decoder produces detection maps indicating a probable location of a set of body joints.

Figure 5:
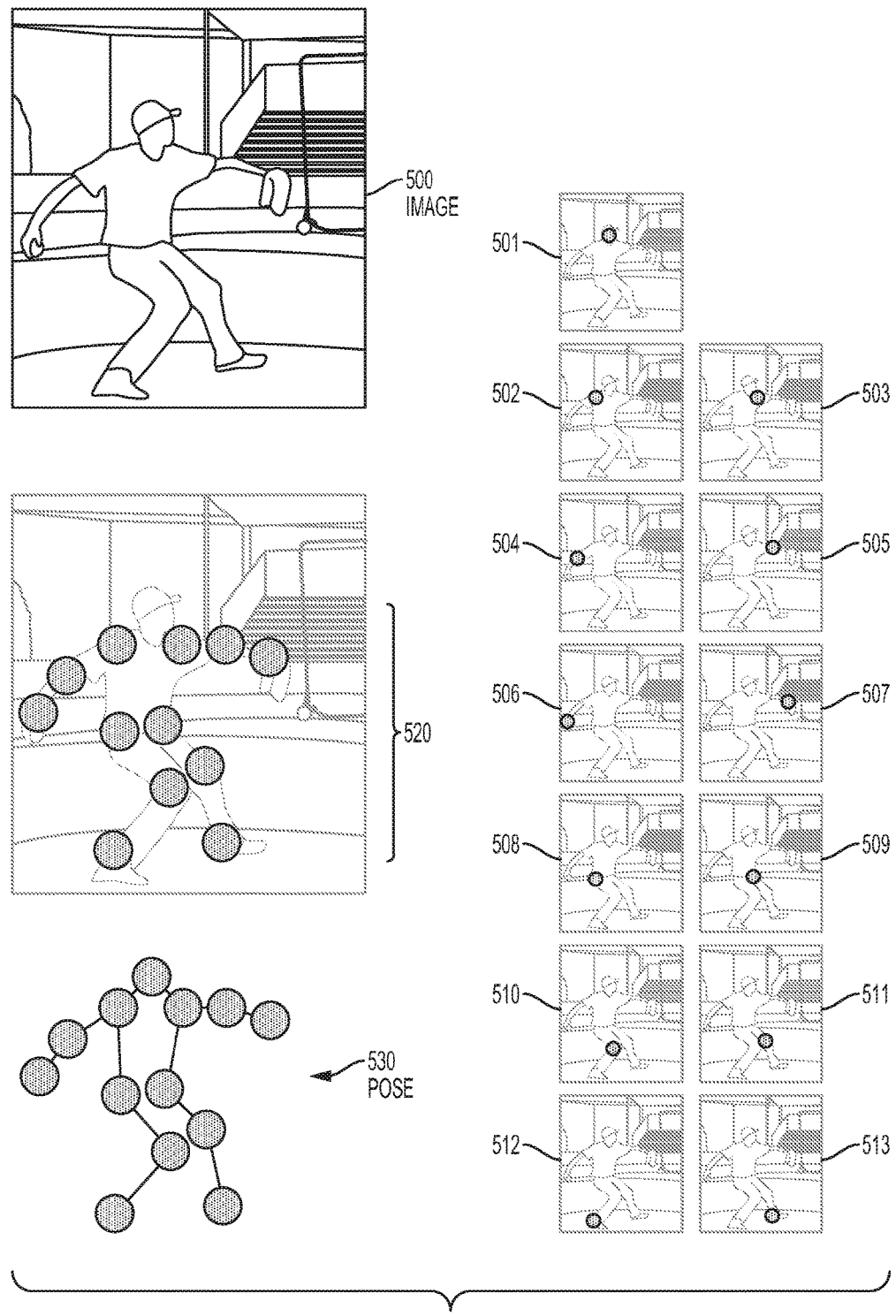
FIG. 5 is a diagram depicting an example of a representation of keypoints determined by a decoder, according to certain embodiments.

FIG. 5 depicts an example representation of keypoints that are determined by a decoder. In an embodiment, a forecasting neural network determines keypoints based on an input image, such as image 500. In some cases, the determined keypoints are represented as detection maps, such as detection maps 501, 502, 503, 504, 505, 506, 507, 508, 509, 510, 511, 512, and 513. A detection map indicates an estimated location of a particular keypoint. Additionally or alternatively, each keypoint is associated with a probability of the estimated location. For example, detection maps 501-513 each indicate a respective estimated location of a keypoint via a black-and-white gradient. For convenience only, and not by way of limitation, each detection map is shown superimposed over a copy of image 500. Although the detection maps 501-513 are depicted as black-and-white graphical images, other representations are possible, including representations not intended for human interpretation. For example, keypoint representations include heatmaps, such that a range of colors (e.g., blue, white, red) corresponds to the probability of the keypoint's location. Additionally or alternatively, keypoint representations include coordinate systems, mathematical data structures, or other non-graphical representations.

In some embodiments, keypoints include identified types. For example, the keypoints represented by detection maps 501-513 are identified as types of body joints, including respectively a head, right shoulder, left shoulder, right elbow, left elbow, right hand, left hand, right hip, left hip, right knee, left knee, right foot, and left foot. In some cases, the keypoints are associated as a set. For example, the keypoints represented by detection maps 501-513 are associated as set 520. Additionally or alternatively, the set of keypoints is associated with additional information, such as the identified types of the keypoints, or information related to the input image. For example, the set of keypoints 520 is associated with the input image 500 and the respective identified types. For convenience only, and not by way of limitation, keypoint set 520 is shown superimposed over a copy of image 500.

Additionally or alternatively, a pose is estimated based on the set of keypoints. For example, a pose reconstruction module, as described at least in regards to FIG. 1, receives a set of keypoints, such as keypoint set 520. Based on the estimated location of each keypoint, the identified type of each keypoint, and information indicating which types of keypoints are connected (e.g., right elbow is connected to right hand and right shoulder), an estimated pose is produced, such as pose 530. Although the pose 530 is depicted as a graphical representation, other representations are possible, including representations not intended for human interpretation. For example, pose representations include coordinate systems, mathematical data structures, or other non-graphical representations.

In some cases, additional poses are estimated based on additional detection maps. For example, a forecasted pose having a timestamp of t=1 is based on detection maps for forecasted keypoints (e.g., based on forecasted features).

Feature Forecasting

In some embodiments, features are provided to the decoder. For example, a decoder included in a forecasting neural network, or in a partial forecasting neural networks, provides one or more forecasted keypoints. Additionally or alternatively, a timestamp is associated with a particular set of keypoints, based on memory information provided to a RNN included in the forecasting neural network which generated the particular set of keypoints.

Figure 6:
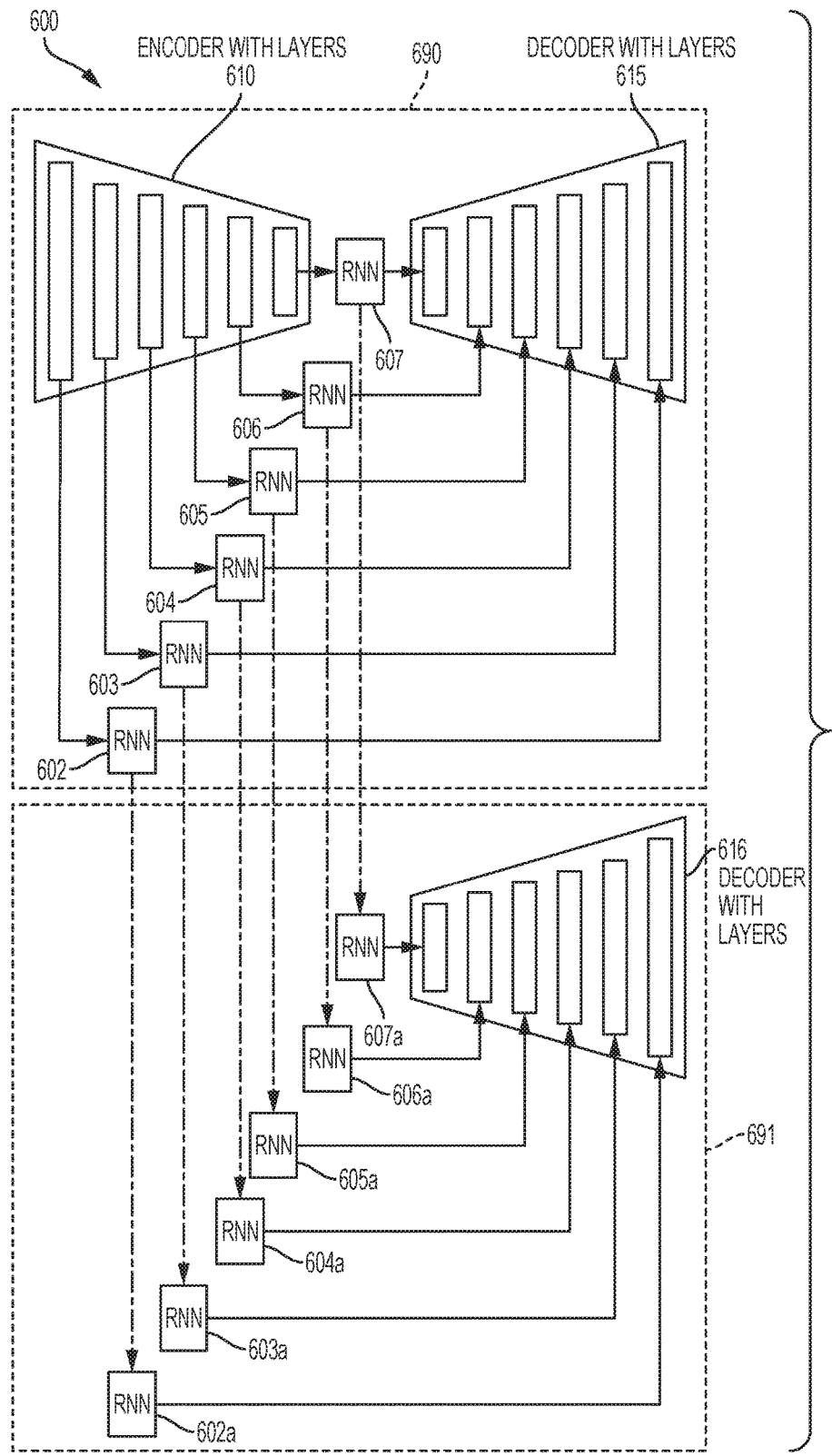
FIG. 6 is a block diagram depicting an example of a system including a forecasting neural network and one or more partial forecasting neural networks having layers and skip connections, according to certain embodiments.

In some embodiments, aspects of the techniques described above are combined. FIG. 6 depicts an example of a forecasting neural network 600 including a recurrent hourglass network 690 with layers and skip connections. The recurrent hourglass network 690 includes encoder 610, decoder 615, and RNNs 602, 603, 604, 605, 606, and 607. The RNNs 602-607 receive outputs from particular layers in encoder 610 via skip connections, and provide inputs to associated layers in decoder 615 via skip connections. The RNNs 602-607 are each capable of generating memory information, such as based on data received via a respective skip connection, and providing the memory information, such as to a respective one of RNNs 602a-607a. The encoder 610 is capable of extracting image features from an input image, and the decoder 615 is capable of determining one or more keypoints based on the input from RNNs 602-607.

In some cases, the forecasting neural network 600 includes a partial recurrent hourglass network 691 with layers and skip connections. The partial recurrent hourglass network 691 includes decoder 616, and RNNs 602a, 603a, 604a, 605a, 606a, and 607a. The RNNs 602a-607a receive memory information generated by a respective one of RNNs 602-607. Additionally or alternatively, RNNs 602a-607a receive outputs from particular layers in encoder 610 via skip connections (not depicted in FIG. 6), and provide input to associated layers in decoder 616 via skip connections. The decoder 616 is capable of determining one or more forecasted keypoints based on the input from RNNs 602a-607a. Additionally or alternatively, RNNs 602a-607a are each capable of generating memory information, such as based on one or more of received memory information or data received via a respective skip connection, and providing the memory information to additional network components, such as to additional RNNs included in an additional partial recurrent hourglass network (not depicted in FIG. 6).

Figure 7:
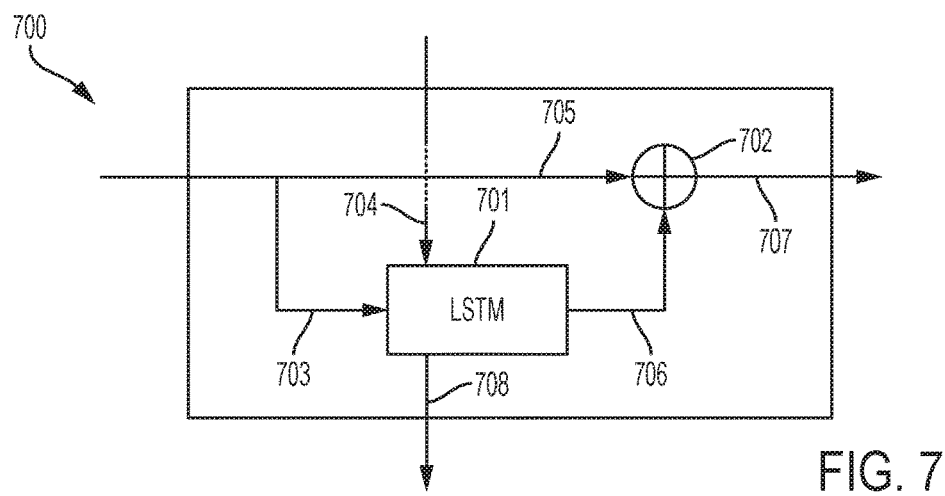
FIG. 7 is a block diagram depicting an example of an RNN having a convolutional long short term memory architecture, according to certain embodiments.
Figure 8:
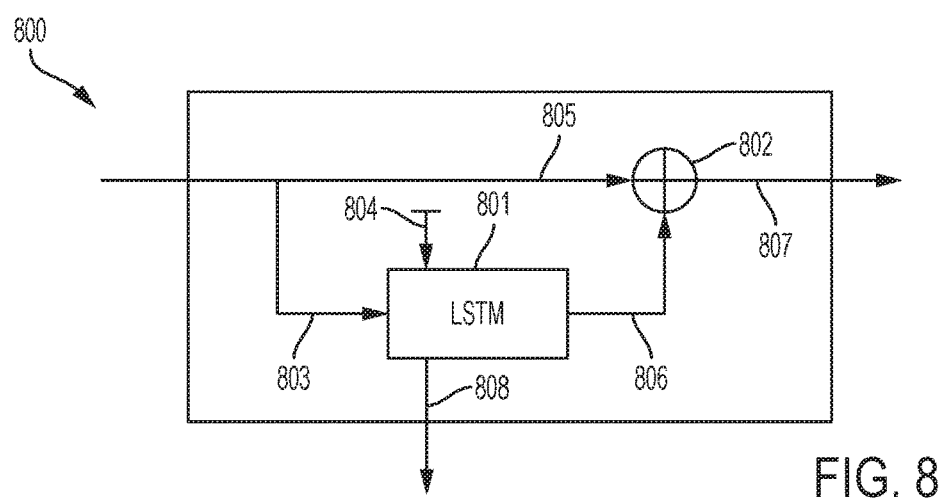
FIG. 8 is a block diagram depicting an example of an RNN having a convolutional long short term memory architecture and receiving null information to a memory input, according to certain embodiments.
Figure 9:
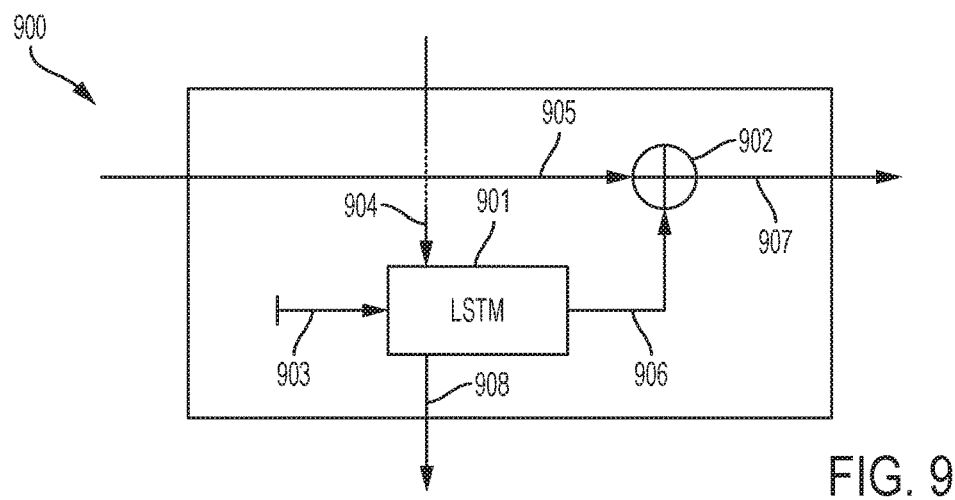
FIG. 9 is a block diagram depicting an example of an RNN having a convolutional long short term memory architecture and receiving null information to a data input, according to certain embodiments.

In some embodiments, one or more RNNs are configured to use a neural network component having a convolutional long short term memory architecture (LSTM). FIGS. 7-9 depict examples of RNNs including LSTM components. FIG. 7 depicts an example of a RNN 700 with LSTM component 701 and convolutional component 702. A first input, such as memory information at a time t, is received on connection 704 to the LSTM component 701. A second input, such as a set of data at a time t, is received on connection 703 to the LSTM component 701, and on connection 705 to convolutional component 702.

In an embodiment, LSTM component 701 provides a first data output on connection 706. The first output from LSTM 701 is based on a combination of the memory information at a time t and the data set at a time t. In some cases, the first output from LSTM 701 includes an indicated modification, such as an indication to modify particular values in the data set at time t. Non-limiting examples of modifications include applying a weight to a value (e.g., multiplying the value by a number between 0 and 1), forgetting a value (e.g., multiplying the value by zero), or remembering a value (e.g., multiplying a value by 1).

The first output from LSTM 701 is received as an input to convolutional component 702, via connection 706. Additionally or alternatively, convolutional component 702 provides a second data output on connection 707. The second output from convolutional component 702 is based on a combination of the data set at a time t and the indicated modification. In some cases, the second output from convolutional component 702 includes a modified data set.

Additionally or alternatively, LSTM component 701 provides a third data output on connection 708. The third output from LSTM 701 is based on the first input, such as memory information at a time t, and the data set received on connection 703. In some cases, the third output from LSTM 701 includes an indicated memory modification, such as an indication of modifications applied by convolutional component 702; an indicated state of the RNN 700, such as an indication of outputs present on one or more of connections 706 or 707; or other suitable information describing the RNN 700 at time t. For example, the third output on connection 708 includes memory information such as weights applied to values, forgetting a value, or remembering a value.

FIG. 8 depicts an example of a RNN 800 with LSTM component 801 and convolutional component 802. In some cases, the RNN 800 is included in a recurrent hourglass network capable of determining keypoints based on extracted features, such as keypoints associated with timestamp of t=0.

In an embodiment, a first input, such as memory information at a time t=0, is received on connection 804 to the LSTM component 801. In some cases, the memory information received on connection 804 is null memory information. A second input, such as data received from an encoder, is received on connection 803 to the LSTM component 801, and on connection 805 to convolutional component 802. In some cases, the received data includes features extracted by the encoder.

In an embodiment, LSTM component 801 provides a first data output on connection 806. The first output from LSTM 801 is based on a combination of the memory information at a time t=0 and the data set including the extracted features. In some cases, the first output from LSTM 801 includes a null modification. For example, based on null memory information received on connection 804, the first data output is similar or identical to the data received on connection 803.

The first output from LSTM 801 is received as an input to convolutional component 802, via connection 806. Additionally or alternatively, convolutional component 802 provides a second data output on connection 807. The second output from convolutional component 802 is based on a combination of the data received on connection 805 and the first output from LSTM 801. In some cases, the second output from convolutional component 802 includes data set including features identical or similar to the features extracted by the encoder.

Additionally or alternatively, LSTM component 801 provides a third data output on connection 808. The third output from LSTM 801 is based on the first input, such as memory information at a time t=0, and the data received on connection 803. In some cases, the third output from LSTM 801 includes an indicated memory modification, such as an indication of modifications based on the received data set; an indicated state of the RNN 800, such as an indication of outputs present on one or more of connections 806 or 807; or other suitable information describing the RNN 800 at time t=0. For example, the third output on connection 808 includes memory information such as weights applied to features, forgetting a feature, or remembering a feature.

FIG. 9 depicts an example of a RNN 900 with LSTM component 901 and convolutional component 902. In some cases, the RNN 900 is included in a partial recurrent hourglass network capable of forecasting keypoints based on forecasted features, such as forecasted keypoints associated with timestamp of t>0.

In an embodiment, a first input, such as memory information, is received on connection 904 to the LSTM component 901. In some cases, the memory information received on connection 904 is provided by another RNN. A second input, such as data received from an encoder, is received on connection 905 to convolutional component 902. In some cases, the received data includes features extracted by the encoder. Additionally or alternatively, no data, or null data (e.g., all zeros) is received on connection 903 to the LSTM component 901.

In an embodiment, LSTM component 901 provides a first data output on connection 906. The first output from LSTM 901 is based on the memory information provided by the other RNN. In some cases, the first output from LSTM 901 includes an indicated modification, such as an indication to modify particular extracted features in the data set. Non-limiting examples of modifications include applying a weight to a feature, forgetting a feature, or remembering a feature.

The first output from LSTM 901 is received as an input to convolutional component 902, via connection 906. Additionally or alternatively, convolutional component 902 provides a second data output on connection 907. The second output from convolutional component 902 is based on a combination of the data received on connection 905 and the indicated modification received on connection 906. In some cases, the second output from convolutional component 902 includes a modified data set, such as a set of forecasted features. Additionally or alternatively, the forecasted features are associated with a timestamp of t>0 (e.g., t=1, t=2 . . . ).

Additionally or alternatively, LSTM component 901 provides a third data output on connection 908. The third output from LSTM 901 is based on the first input, such as memory information at a time t, and the data received on connection 903. In some cases, the third output from LSTM 901 includes an indicated memory modification, such as an indication of modifications applied by convolutional component 902; an indicated state of the RNN 900, such as an indication of outputs present on one or more of connections 906 or 907; or other suitable information describing the RNN 900 at time t>0. For example, the third output on connection 908 includes memory information such as weights applied to features, forgetting a feature, or remembering a feature.

The example neural networks depicted and described herein are for illustrative purposes only. Additional configurations, including networks with fewer, similar or greater numbers of components and/or layers, are envisioned, including configurations with unknown numbers of components and/or layers (e.g., configurations generated via neural network training).

Pose Forecasting

In some embodiments, forecasting neural networks, or partial forecasting neural networks, provide one or more forecasted keypoints based on an input image. Additionally or alternatively, a pose is reconstructed based on the keypoints, and the pose is associated with the timestamp of the keypoints.

Figure 10:
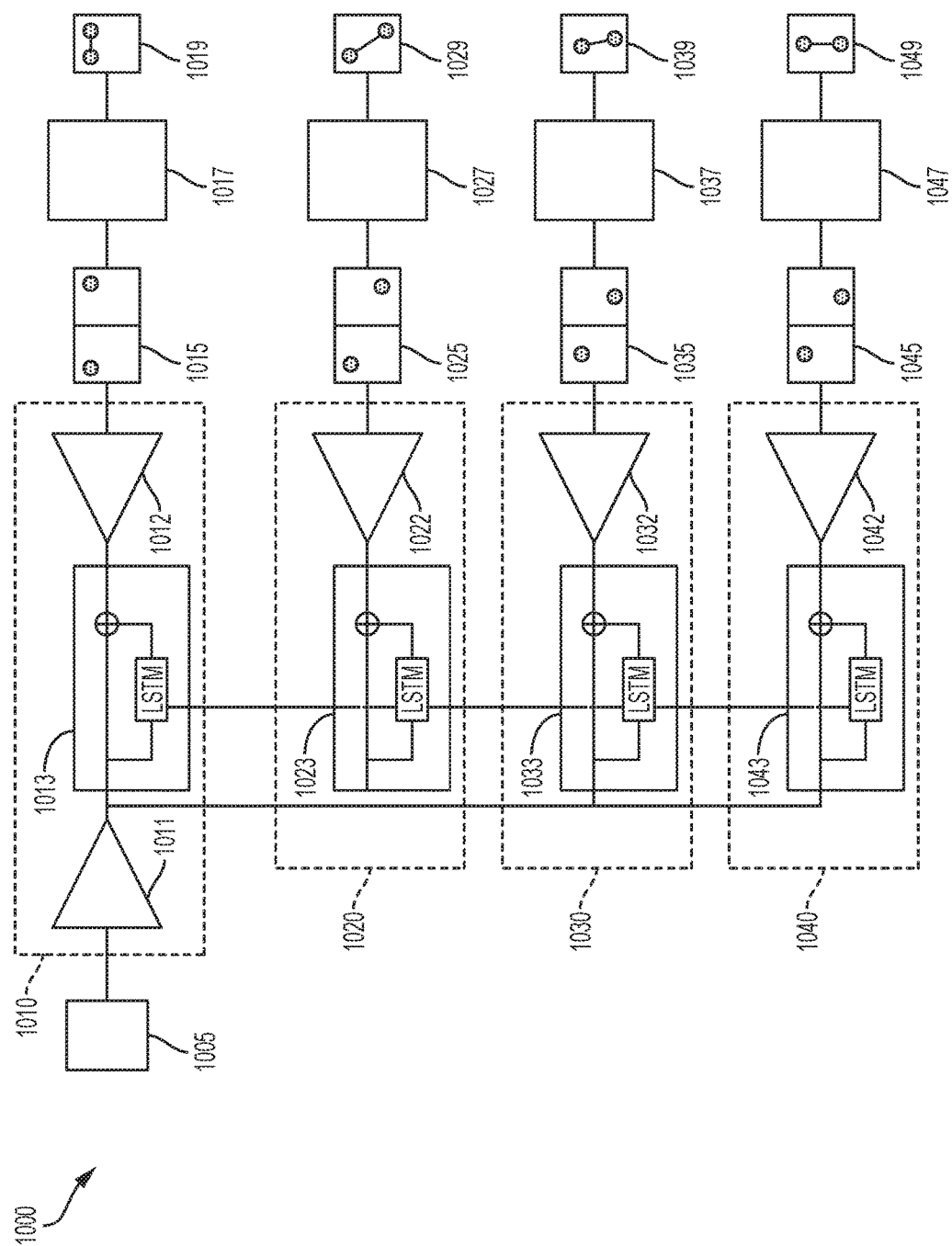
FIG. 10 is a block diagram depicting an example of a system including a forecasting neural network and one or more partial forecasting neural networks having a convolutional long short term memory architecture, according to certain embodiments.

In some embodiments, aspects of the techniques described above are combined. FIG. 10 depicts an example of a forecasting neural network 1000 including a recurrent hourglass network 1010. The recurrent hourglass network 1010 includes encoder 1011, decoder 1012, and RNN 1013 having an LSTM architecture, such as LSTM 800 described in regards to FIG. 8. In some cases, recurrent hourglass network 1010 includes one or more of layers or skip connections.

Additionally or alternatively, the forecasting neural network 1000 includes one or more partial recurrent hourglass networks, such as partial recurrent hourglass networks 1020, 1030, and 1040. The partial recurrent hourglass networks 1020, 1030, and 1040 include respective decoders 1022, 1032, and 1042, and respective RNNs 1023, 1033, and 1043 each having an LSTM architecture, such as LSTM 900 described in regards to FIG. 9. In some cases, each of partial recurrent hourglass networks 1020, 1030, and 1040 includes one or more of layers or skip connections.

In some embodiments, each of the networks 1010, 1020, 1030, and 1040 provides a respective set of keypoints. For example, an input image 1005 is provided to the recurrent hourglass network 1010. Extracted features and null memory information are provided to RNN 1013. Additionally or alternatively, RNN 1013 provides memory information to RNN 1023. In some cases, recurrent hourglass network 1010 provides a set of keypoints 1015 to pose reconstruction module 1017, and pose 1019 is generated by module 1017 based on the keypoints 1015.

Additionally or alternatively, the memory information from RNN 1013 and the extracted features are provided to RNN 1023, which provides memory information to RNN 1033. In some cases, partial recurrent hourglass network 1020 provides a set of forecasted keypoints 1025 to pose reconstruction module 1027, and forecasted pose 1029 is generated by module 1027 based on the forecasted keypoints 1025.

In some cases, the memory information from RNN 1023 and the extracted features are provided to RNN 1033, which provides memory information to RNN 1043. In some cases, partial recurrent hourglass network 1030 provides a set of forecasted keypoints 1035 to pose reconstruction module 1037, and forecasted pose 1039 is generated by module 1037 based on the forecasted keypoints 1035. Additionally or alternatively, the memory information from RNN 1033 and the extracted features are provided to RNN 1043. In some cases, partial recurrent hourglass network 1040 provides a set of forecasted keypoints 1045 to pose reconstruction module 1047, and forecasted pose 1049 is generated by module 1047 based on the forecasted keypoints 1045.

In some embodiments, techniques related to forecasting poses are repeated multiple times, based on the implementation of the system. For example, memory information from RNN 1043 is provided to additional partial recurrent hourglass networks, and additional poses are forecasted.

Optical Flow Forecasting

In some embodiments, pixel displacement is estimated based on extracted or forecasted features. For example, based on the features extracted from the input image, an additional decoder determines an apparent motion (e.g., optical flow) of the input image. For convenience, and not by way of limitation, the additional decoder is referred to herein as a flow decoder. The flow decoder determines apparent motion of the input image, such as by estimating a displacement direction and distance of a pixel in the image. In some cases, the estimated displacement of the pixel is represented as a vector associated with the pixel. In some embodiments, the flow decoder determines an estimated displacement for one or more pixels in the image.

In some embodiments, a flow decoder determines pixel displacement based on one or more of forecasted features, forecasted keypoints, or a forecasted pose. For example, pixel displacement is based on a difference between a set of extracted features (e.g., having a timestamp of t=0) and a set of forecasted features (e.g., having a timestamp of t>0). Additionally or alternatively, pixel displacement is based on a difference between a first set of forecasted features (e.g., having a timestamp of t=1) and a second set of forecasted features (e.g., having a timestamp of t=2).

Figure 11:
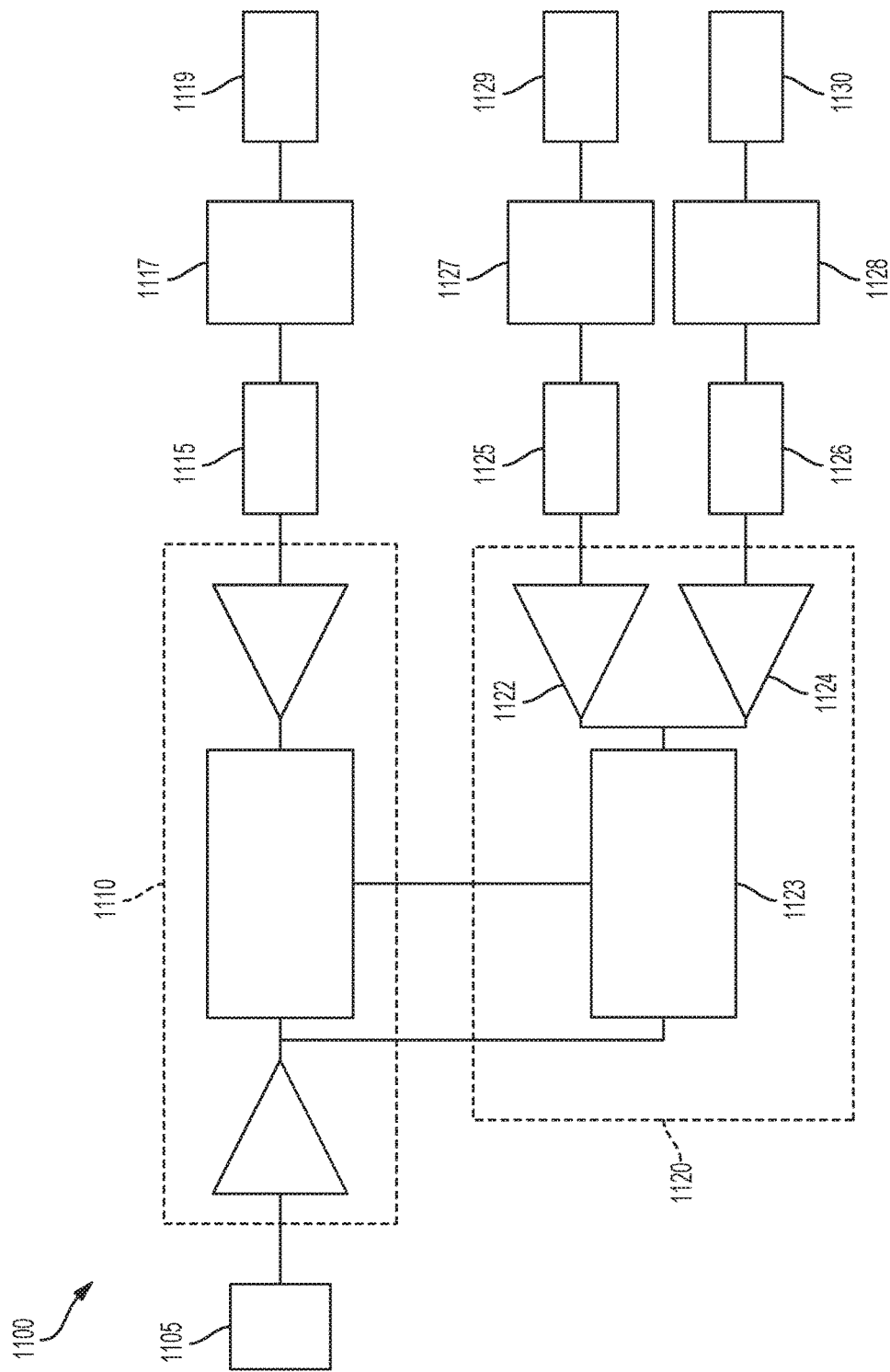
FIG. 11 is a block diagram depicting an example of a system including a flow decoder network, according to certain embodiments.

FIG. 11 depicts an example of a forecasting neural network 1100 including a recurrent hourglass network 1110, and one or more partial recurrent hourglass networks, such as network 1120. In some cases, the networks 1110 and 1120 include one or more of layers, skip connections, or LSTM architecture.

In some embodiments, the recurrent hourglass network 1110 receives an image 1105. The recurrent hourglass network 1110 provides a set of keypoints 1115, which is provided to a pose reconstruction module 1117. The pose reconstruction module estimates a pose 1119 based on the keypoints 1115. In some cases, a pose 1119 is associated with information from input image 1105. For example, pose 1119 is associated with the location of one or more pixels included in image 1105.

Additionally or alternatively, the partial recurrent hourglass network 1120 receives extracted features and memory information from network 1110. In some cases, the network 1120 includes RNN 1123, decoder 1122, and flow decoder 1124. The RNN 1123 determines a set of forecasted features, and provides the forecasted features to decoder 1122. In some cases, decoder 1122 provides a set of forecasted keypoints 1125, and pose reconstruction module 1127 provide forecasted pose 1129 based on the forecasted keypoints 1125.

Additionally or alternatively, RNN 1123 provides one or more of the forecasted features or associated image information to flow decoder 1124. In some cases, flow decoder 1124 determines an apparent motion of the pixels associated with the forecasted features. For example, the flow decoder 1124 provides vector information 1126. In some cases, the vector information 1126 is based on a comparison of pixel locations in the image 1105 and the locations of the forecasted features provided by RNN 1123. Additionally or alternatively, vector information 1126 is based on a comparison of the locations of extracted features provided by network 1110 and the locations of forecasted features provided by RNN 1123.

In some embodiments, a modified image is generated based on the vector information 1126. For example, an image reconstruction module 1128 receives the vector information 1126, and generates a modified image 1130 based on the vector information 1126. Additionally or alternatively, the modified image 1130 is based on image information from input image 1105.

Example Operations and Systems

Figure 12:
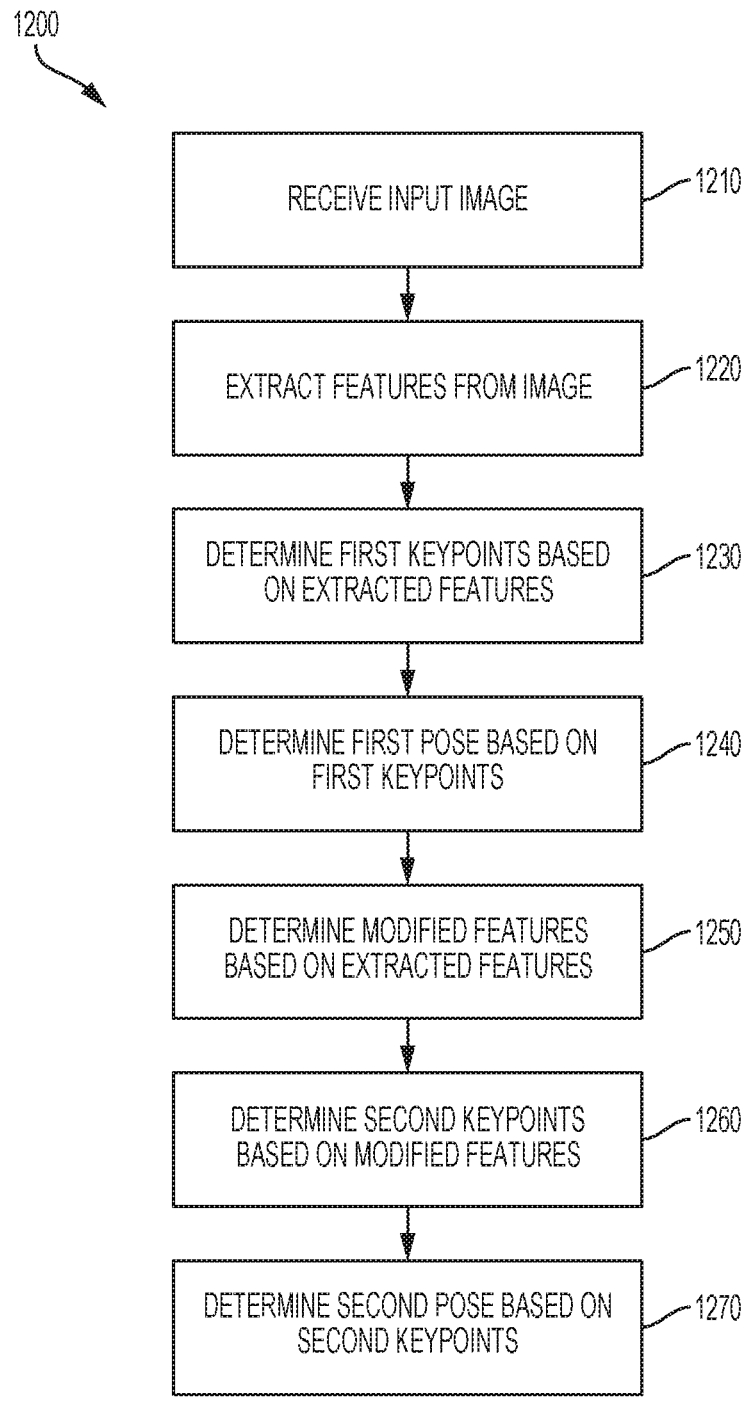
FIG. 12 is a flow chart depicting an example of a process for determining multiple poses based on a received input image, according to certain embodiments.

FIG. 12 is a flow chart depicting an example of a process 1200 for determining the multiple poses based on a received input image. In some embodiments, such as described in regards to FIGS. 1-11 a computing device executing one or more forecasting neural networks implements operations described in FIG. 12, by executing suitable program code. For illustrative purposes, the process 1200 is described with reference to the examples depicted in FIGS. 1-11. Other implementations, however, are possible.

At block 1210, the process 1200 involves receiving an input image. In some embodiments, the input image is received by a forecasting neural network, such as described with regards to FIG. 1. In some cases, the input image is a graphical image, such as an image comprising pixels.

At block 1220, the process 1200 involves extracting one or more features from the received image. In some cases, the features are extracted by an encoder included in the forecasting neural network. In some cases, the features are extracted by one or more layers included in the encoder.

At block 1230, the process 1200 involves determining a first set of keypoints based on the extracted features. In some embodiments, the first set of keypoints is determined by a decoder included in the forecasting neural network, such as described with regards to FIG. 1. In some cases, the first set of keypoints is determined based in part on information received via skip connections.

At block 1240, the process 1200 involves determining a first pose based on the first set of keypoints. For example, the first pose is determined by a pose reconstruction module based on keypoints received from a decoder.

At block 1250, the process 1200 involves determining one or more modified features based on the extracted features. For example, an RNN determines forecasted features based on the extracted features. Additionally or alternatively, the modified features are based on memory information, such as memory information received from an additional RNN.

At block 1260, the process 1200 involves determining a second set of keypoints based on the modified features. In some embodiments, the second set of keypoints is determined by a decoder included in a partial forecasting neural network, such as described in regards to FIG. 2. In some cases, the second set of keypoints is determined based in part on information received via skip connections.

At block 1270, the process 1200 involves the determining a second pose based on the second set of keypoints. For example, a pose reconstruction module determines a forecasted pose based on a set of forecasted keypoints.

In some embodiments, operations related to blocks 1250, 1260, and 1270 are repeated for each additional forecasted pose. For example, memory information and the extracted features are provided to additional partial forecasting neural networks associated with additional pose generation modules, as described in regards to FIG. 2.

Figure 13:
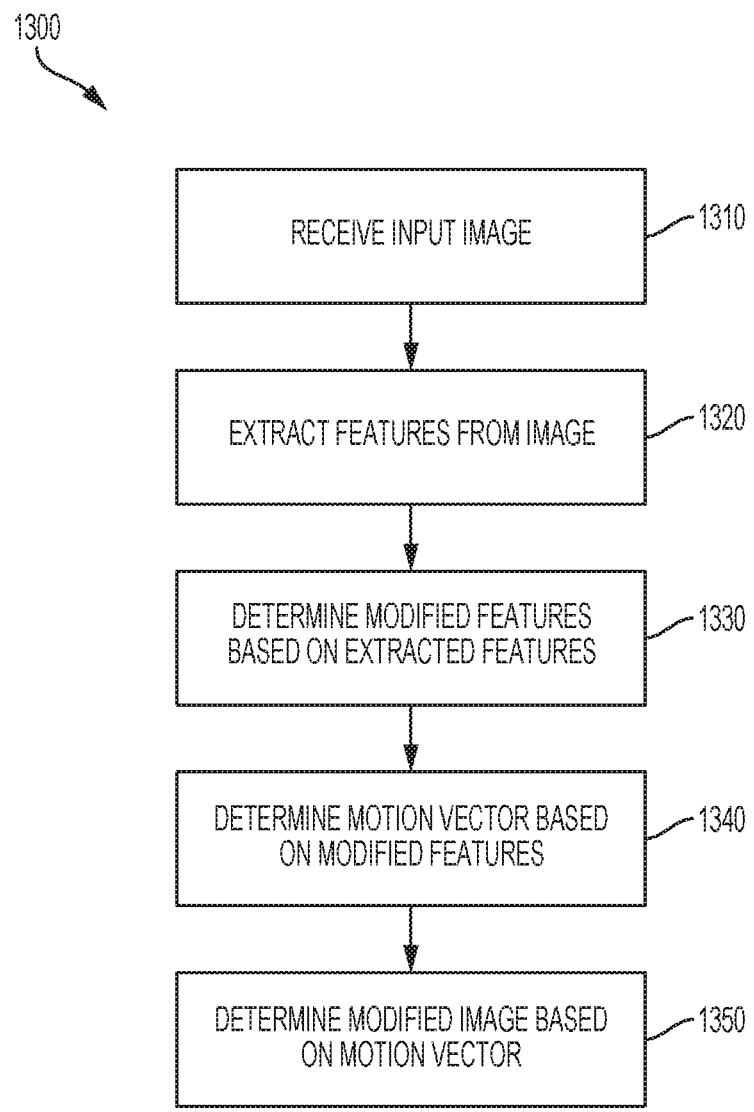
FIG. 13 is a flow chart depicting an example of a process for determining apparent motion of pixels included in a received input image, according to certain embodiments.

FIG. 13 is a flow chart depicting an example of a process 1300 for determining apparent motion of pixels included in a received input image. In some embodiments, such as described in regards to FIGS. 1-12, a computing device executing one or more forecasting neural networks implements operations described in FIG. 13, by executing suitable program code. For illustrative purposes, the process 1300 is described with reference to the examples depicted in FIGS. 1-12. Other implementations, however, are possible.

At block 1310, the process 1300 involves receiving an input image, such as a forecasting neural network described with regards to FIG. 1. In some cases, the input image is a graphical image, such as an image comprising pixels.

At block 1320, the process 1300 involves extracting one or more features from the received image. In some cases, the features are extracted by an encoder included in the forecasting neural network. Some cases, the features are extracted by one or more layers included in the encoder.

At block 1330, the process 1300 involves being one or more modified features based on the extracted features. For example, an RNN determines forecasted features based on the extracted features. Additionally or alternatively, the modified are based on memory information, such as memory information received from an additional RNN.

In some embodiments, operations related to 1310, 1320, and 1330 are performed in relation to other processes, such as process 1100 as described in regards to FIG. 11.

At block 1340, the process 1300 involves determining motion vector information based on the modified features. In some embodiments, the motion vector information is determined by a flow decoder included in a partial forecasting neural network, such as described with regards to FIG. 11. In some cases, the motion vector information is determined based in part on information received via skip connections.

At block 1350, the process 1300 involves determining a modified image based on the motion vector information. For example, a modified image is generated by an image reconstruction module, such as described in regards to FIG. 11. In some cases, the modified image is a forecasted image based on the estimated motion of pixels related to a forecasted pose.

Figure 14:
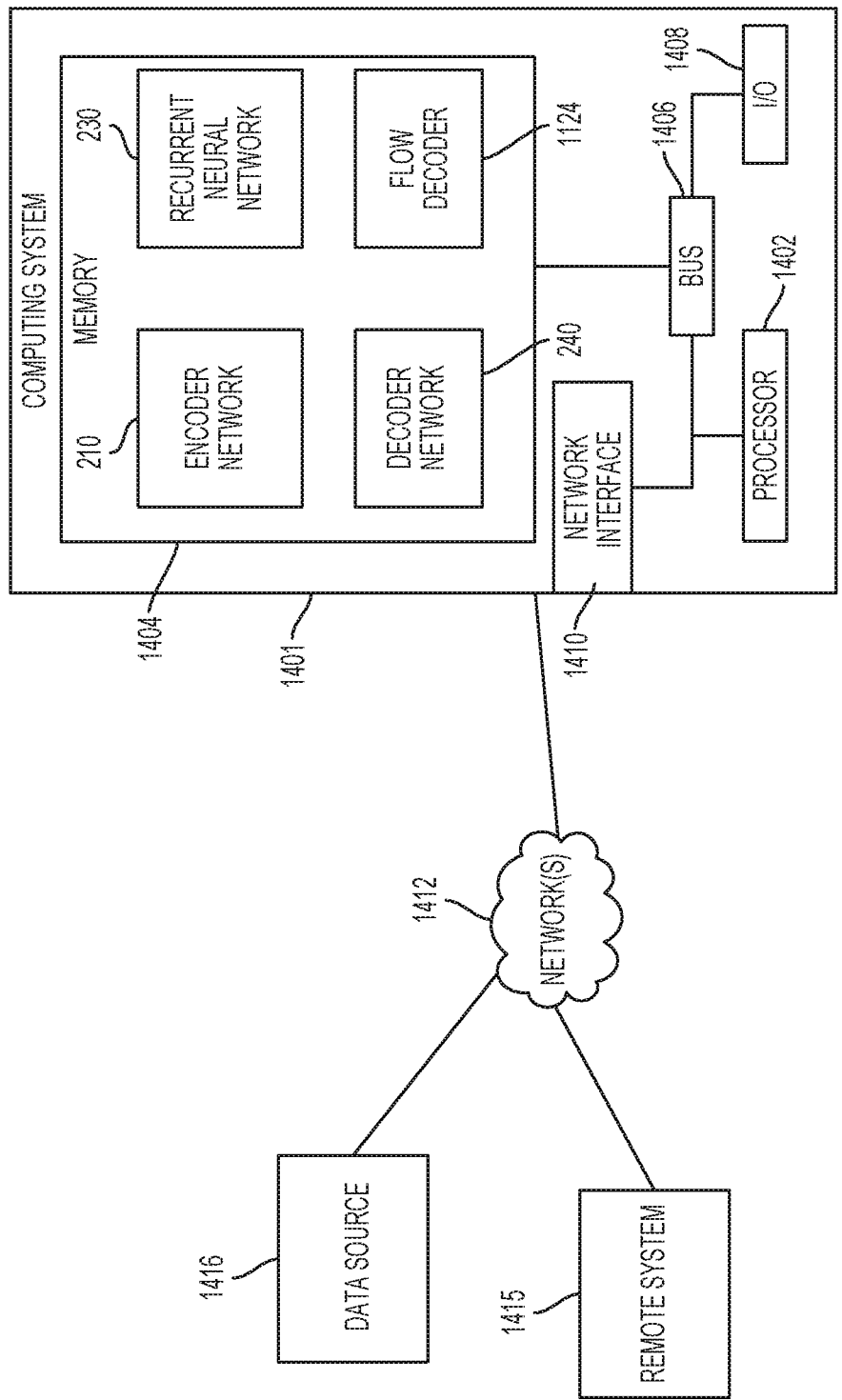
FIG. 14 is a block diagram of a computing system including a forecasting neural network, according to certain embodiments.

Any suitable computing system or group of computing systems can be used for performing the operations described herein. For example, FIG. 14 is a block diagram depicting a system capable of forecasting one or more poses based on an input image, according to certain embodiments.

The depicted example of a computing system 1401 includes one or more processors 1402 communicatively coupled to one or more memory devices 1404. The processor 1402 executes computer-executable program code or accesses information stored in the memory device 1404. Examples of processor 1402 include a microprocessor, an application-specific integrated circuit ("ASIC"), a field-programmable gate array ("FPGA"), or other suitable processing device. The processor 1402 can include any number of processing devices, including one.

The memory device 1404 includes any suitable non-transitory computer-readable medium for storing the color selection system 110, the correlated color images 135, the point cloud model 130, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1401 may also include a number of external or internal devices such as input or output devices. For example, the computing system 1401 is shown with an input/output ("I/O") interface 1408 that can receive input from input devices or provide output to output devices.

A bus 1406 can also be included in the computing system 1401. The bus 1406 can communicatively couple one or more components of the computing system 1401.

The computing system 1401 executes program code that configures the processor 1402 to perform one or more of the operations described above with respect to FIGS. 1-13. The program code includes operations related to, for example, one or more of encoder 210, decoder 240, RNN 230, flow decoder 1124, or other suitable applications or memory structures that perform one or more operations described herein. The program code may be resident in the memory device 1404 or any suitable computer-readable medium and may be executed by the processor 1402 or any other suitable processor. In some embodiments, the program code described above, the encoder 210, the decoder 240, the RNN 230, or the flow decoder 1124 are stored in the memory device 1404, as depicted in FIG. 14. In additional or alternative embodiments, one or more of the encoder 210, the decoder 240, the RNN 230, or the flow decoder 1124, and the program code described above are stored in one or more memory devices accessible via a data network, such as a memory device accessible via a cloud service.

The computing system 1401 depicted in FIG. 14 also includes at least one network interface 1410. The network interface 1410 includes any device or group of devices suitable for establishing a wired or wireless data connection to one or more data networks 1412. Non-limiting examples of the network interface 1410 include an Ethernet network adapter, a modem, and/or the like. In some embodiments, one or more additional computing components, such as remote system 1415 or data source 1416, are connected to the computing system 1401 via network 1412, and perform some of the operations described herein. For example, remote system 1415 performs operations related to pose reconstruction module 150 or image reconstruction module 1128. Additionally or alternatively, data source 1416 provides input image 105. The computing system 1401 is able to communicate with one or more of the remote computing system 1415 and the data source 1416 using the network interface 1410. Although FIG. 14 depicts remote computing system 1415 and data source 1416 as connected to computing system 1401 via the networks 1412, other embodiments are possible, including operating as programs in the memory 1404 of computing device 1401.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

The neural network components described herein may have various implementations. Although the included examples are depicted and described as separate neural network components for clarity, other configurations are possible, including subsequent operations performed by a same component or set of components.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of forecasting a position of a subject depicted by an image, the method comprising:
   receiving, by a forecasting neural network, an image depicting a subject, wherein the forecasting neural network comprises an encoder neural network, a recurrent neural network, and a decoder neural network;
   extracting, by the encoder neural network, a feature of the received image;
   providing the extracted feature to the recurrent neural network;
   determining, by the recurrent neural network, a modification to the extracted feature;
   generating, by the recurrent neural network, a forecasted feature based on memory information describing the determined modification;
   providing the forecasted feature to the decoder neural network; and
   generating, by the decoder neural network, a set of keypoints, wherein each keypoint in the set of keypoints indicates a forecasted position of a respective portion of the image subject.

2. The method of claim 1, wherein the recurrent neural network includes a long short term memory (LSTM) neural network.

3. The method of claim 1, wherein the recurrent neural network provides the forecasted feature based on a convolution of (i) the extracted feature and (ii) the memory information describing the modification.

4. The method of claim 1, further comprising:
   identifying, by the decoder neural network, a type of each keypoint in the set of keypoints; and
   generating a pose based on the identified type of each keypoint in the set of keypoints and information indicating connections between the identified types.

5. The method of claim 1, further comprising:
   extracting, by a particular layer included in the encoder, an additional feature from the image;
   providing the additional extracted feature to an additional recurrent neural network;
   determining, by the additional recurrent neural network, an additional modification to the additional extracted feature;
   generating, by the additional recurrent neural network, an additional forecasted feature based on the additional modification; and
   generating, by an associated layer included in the decoder neural network, an additional set of forecasted keypoints based on the additional forecasted feature.

6. The method of claim 1, further comprising:
   producing, with a flow decoder neural network, a set of motion vectors based on the forecasted feature,
   wherein each motion vector in the set of motion vectors corresponds to a respective pixel in the received image.

7. The method of claim 6, further comprising:
   determining a forecasted position of each pixel in the received image based on the motion vector, from the set of motion vectors, that corresponds to the respective pixel in the received image; and
   generating an image based on the forecasted position of each pixel in the received image.

8. A non-transitory computer-readable medium embodying program code for producing a pose from an input image, the program code comprising instructions which, when executed by a processor, cause the processor to perform operations comprising:
   receiving, by a forecasting neural network, an image depicting a subject, wherein the forecasting neural network comprises an encoder neural network, a recurrent neural network, and a decoder neural network;
   extracting, by the encoder neural network, a feature of the received image;
   providing the extracted feature to the recurrent neural network;
   determining, by the recurrent neural network, a modification to the extracted feature;
   generating, by the recurrent neural network, a forecasted feature based memory information describing on the determined modification;
   providing the forecasted feature to the decoder neural network; and
   generating, by the decoder neural network, a set of keypoints, wherein each keypoint in the set of keypoints indicates a forecasted position of a respective portion of the image subject.

9. The non-transitory computer-readable medium of claim 8, wherein the recurrent neural network includes a long short term memory (LSTM) neural network.

10. The non-transitory computer-readable medium of claim 8, wherein the recurrent neural network provides the forecasted feature based on a convolution of (i) the extracted feature and (ii) the memory information describing the modification.

11. The non-transitory computer-readable medium of claim 8, the operations further comprising:
   identifying, by the decoder neural network, a type of each keypoint in the set of keypoints; and
   generating a pose based on the identified type of each keypoint in the set of keypoints and information indicating connections between the identified types.

12. The non-transitory computer-readable medium of claim 8, the operations further comprising:
   extracting, by a particular layer included in the encoder, an additional feature from the image;
   providing the additional extracted feature to an additional recurrent neural network;
   determining, by the additional recurrent neural network, an additional modification to the additional extracted feature;
   generating, by the additional recurrent neural network, an additional forecasted feature based on the additional modification; and
   generating, by an associated layer included in the decoder neural network, an additional set of forecasted keypoints based on the additional forecasted feature.

13. The non-transitory computer-readable medium of claim 8, the operations further comprising:
   producing, with a flow decoder neural network, a set of motion vectors based on the forecasted feature,
   wherein each motion vector in the set of motion vectors corresponds to a respective pixel in the received image.

14. The non-transitory computer-readable medium of claim 13, the operations further comprising:
   determining a forecasted position of each pixel in the received image based on the motion vector, from the set of motion vectors, that corresponds to the respective pixel in the received image; and
   generating an image based on the forecasted position of each pixel in the received image.

15. A system for producing a pose from an input image, the system comprising:
   a means for receiving, by a forecasting neural network, an image depicting a subject, wherein the forecasting neural network comprises an encoder neural network, a recurrent neural network, and a decoder neural network;
   a means for extracting, by the encoder neural network, a feature of the received image;
   a means for providing the extracted feature to the recurrent neural network;
   a means for determining, by the recurrent neural network, a modification to the extracted feature;
   a means for generating, by the recurrent neural network, a forecasted feature based on memory information describing the determined modification;
   a means for providing the forecasted feature to the decoder neural network; and
   a means for generating, by the decoder neural network, a set of keypoints, wherein each keypoint in the set of keypoints indicates a forecasted position of a respective portion of the image subject.

16. The system of claim 15, wherein the recurrent neural network provides the forecasted feature based on a convolution of (i) the extracted feature and (ii) the memory information describing the modification.

17. The system of claim 15, further comprising:
   a means for identifying, by the decoder neural network, a type of each keypoint in the set of keypoints; and
   a means for generating a pose based on the identified type of each keypoint in the set of keypoints and information indicating connections between the identified types.

18. The system of claim 15, further comprising:
   a means for extracting, by a particular layer included in the encoder, an additional feature from the image;
   a means for providing the additional extracted feature to an additional recurrent neural network;
   a means for determining, by the additional recurrent neural network, an additional modification to the additional extracted feature;
   a means for generating, by the additional recurrent neural network, an additional forecasted feature based on the additional modification; and
   a means for generating, by an associated layer included in the decoder neural network, an additional set of forecasted keypoints based on the additional forecasted feature.

19. The system of claim 15, further comprising:
   a means for producing, with a flow decoder neural network, a set of motion vectors based on the forecasted feature,
   a means for wherein each motion vector in the set of motion vectors corresponds to a respective pixel in the received image.

20. The system of claim 19, further comprising:
   a means for determining a forecasted position of each pixel in the received image based on the motion vector, from the set of motion vectors, that corresponds to the respective pixel in the received image; and
   a means for generating an image based on the forecasted position of each pixel in the received image.

* * * * *